(12) United States Patent
Omura

(10) Patent No.: US 9,510,574 B2
(45) Date of Patent: Dec. 6, 2016

(54) FISHING LINE GUIDE AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka-shi (JP)

( * ) Notice: Subject to any disclaimer, the term of this patent is extended or adjusted under 35 U.S.C. 154(b) by 0 days.

(21) Appl. No.: 14/911,177

(22) PCT Filed: Sep. 2, 2014

(86) PCT No.: PCT/JP2014/073028
§ 371 (c)(1),
(2) Date: Feb. 9, 2016

(87) PCT Pub. No.: WO2015/037469
PCT Pub. Date: Mar. 19, 2015

(65) Prior Publication Data
US 2016/0183506 A1   Jun. 30, 2016

(30) Foreign Application Priority Data

Sep. 10, 2013 (KR) .................. 10-2013-0108608
Apr. 22, 2014 (KR) .................. 10-2014-0048211

(51) Int. Cl.
*A01K 87/04* (2006.01)

(52) U.S. Cl.
CPC .................... *A01K 87/04* (2013.01)

(58) Field of Classification Search
USPC ............................................. 43/24
See application file for complete search history.

(56) References Cited

U.S. PATENT DOCUMENTS

D139,411 S * 11/1944 Treaway ..................... 43/24
2,872,751 A * 2/1959 Mayfield ............... A01K 87/04
                                                          43/24
(Continued)

FOREIGN PATENT DOCUMENTS

JP      5-7074       2/1993
JP      9-121727     5/1997
(Continued)

OTHER PUBLICATIONS

"General Catalog of Fuji Kogyo Co., Ltd." Jan. 20, 2006, 3 pages.
(Continued)

*Primary Examiner* — Christopher P Ellis
(74) *Attorney, Agent, or Firm* — Oblon, McClelland, Maier & Neustadt, L.L.P.

(57) ABSTRACT

A fishing line guide includes a pair of lateral support legs and one rear support leg which extend from a guide ring. When viewing the fishing line guide from front, an outer contour of the lateral support legs is inclined from an attachment foot thereof at an angle of 45 degrees or more with respect to a horizontal line passing the attachment foot. An outer contour of the guide ring has a curve line, which has a center located outside the outer contour of the guide ring, from a position located at 45 degrees below the center of the guide ring. An upper contour of the lateral support legs joins to the outer contour of the guide ring above the center of the guide ring. A lower contour of the lateral support legs joins to the outer contour of the guide ring below the center of the guide ring.

17 Claims, 30 Drawing Sheets

(56) References Cited

U.S. PATENT DOCUMENTS

| | | | | |
|---|---|---|---|---|
| 3,063,186 | A | * | 11/1962 | Ward, IV .............. A01K 87/04 43/24 |
| 3,690,027 | A | * | 9/1972 | Ohmura ................ B21D 53/00 43/24 |
| 3,760,524 | A | * | 9/1973 | Butler, Jr. ............. A01K 87/04 156/165 |
| 4,011,680 | A | * | 3/1977 | Rienzo, Sr. ........... A01K 87/04 43/24 |
| 4,141,132 | A | * | 2/1979 | Ohmura ................ A01K 87/04 29/432 |
| 4,215,504 | A | * | 8/1980 | Ohmura ................ A01K 87/04 43/24 |
| 5,870,848 | A | | 2/1999 | Ohmura |
| 6,378,240 | B1 | | 4/2002 | Ohmura |
| 8,365,458 | B2 | | 2/2013 | Omura |
| 2005/0172535 | A1 | | 8/2005 | Lee |
| 2006/0283073 | A1 | | 12/2006 | Omura |
| 2009/0165355 | A1 | * | 7/2009 | Jeong .................... A01K 87/04 43/24 |

FOREIGN PATENT DOCUMENTS

| | | |
|---|---|---|
| JP | 10-4832 | 1/1998 |
| JP | 10-313743 | 12/1998 |
| JP | 11-103728 A | 4/1999 |
| JP | 1037054 | 4/1999 |
| JP | 11-225628 | 8/1999 |
| JP | 2000-253778 A | 9/2000 |
| JP | 2004-24080 A | 1/2004 |
| JP | 2004-89055 A | 3/2004 |
| JP | 2008-125463 A | 6/2008 |
| JP | 4755670 | 8/2011 |
| JP | 2012-70666 A | 4/2012 |
| JP | 2013-158309 A | 8/2013 |
| JP | 14/73028 | 9/2014 |

OTHER PUBLICATIONS

International Search Report Issued Dec. 9, 2014 in PCT/JP14/73028 Filed Sep. 2, 2014.

* cited by examiner

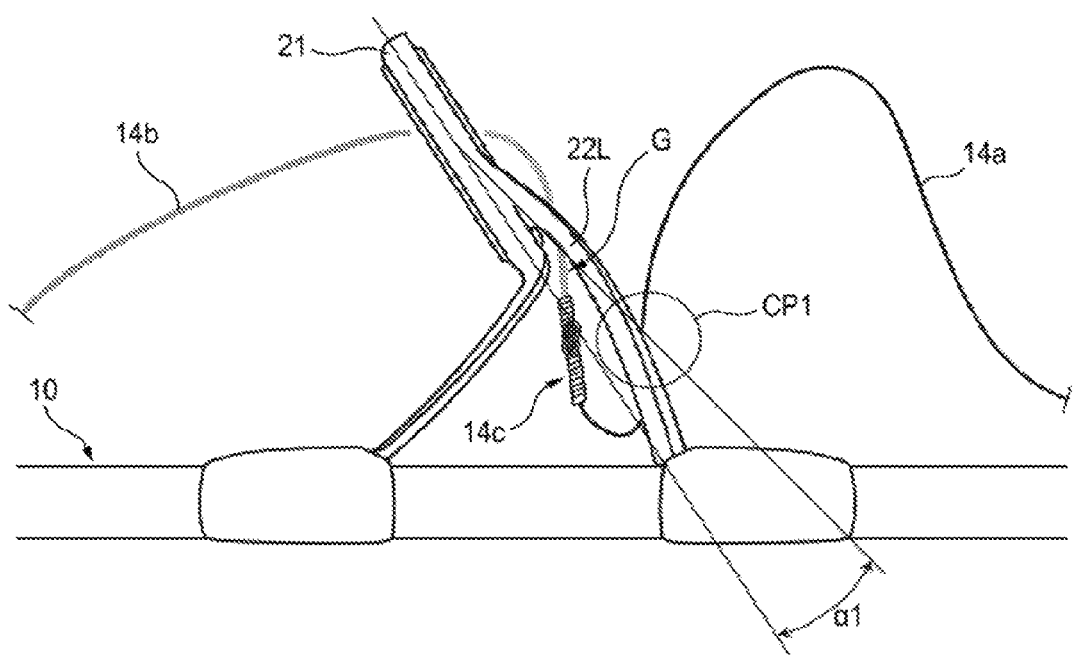

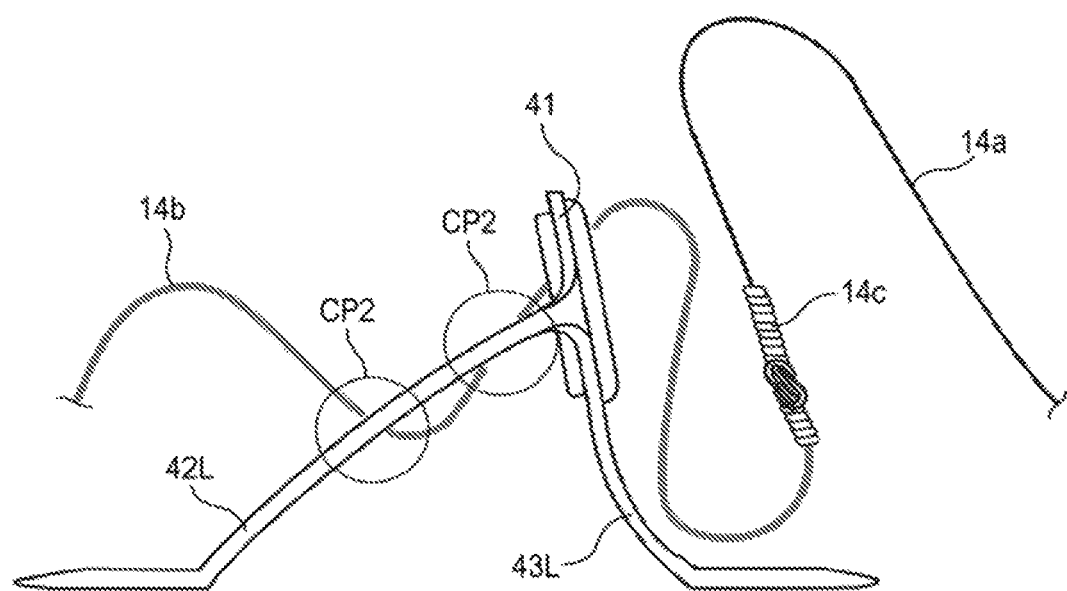

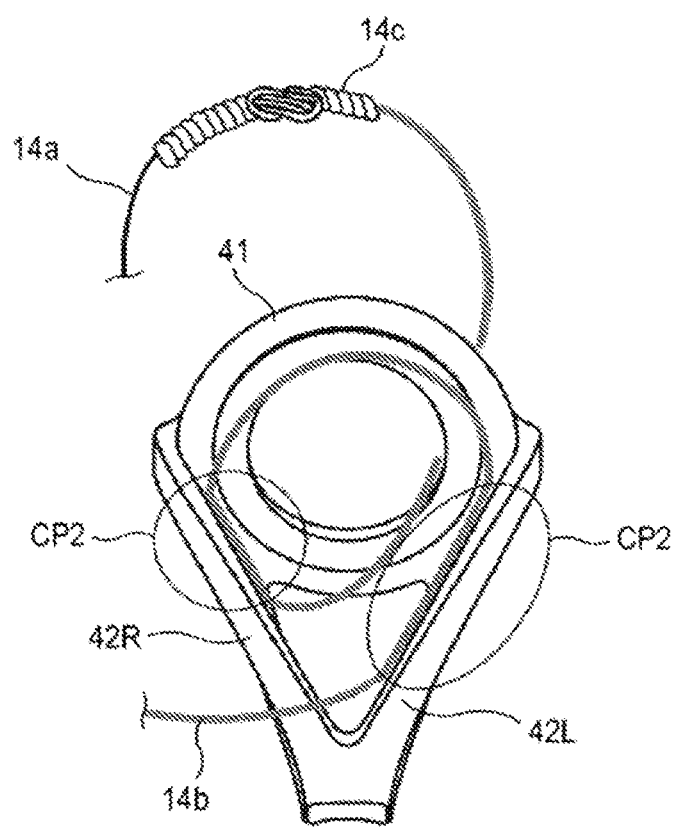

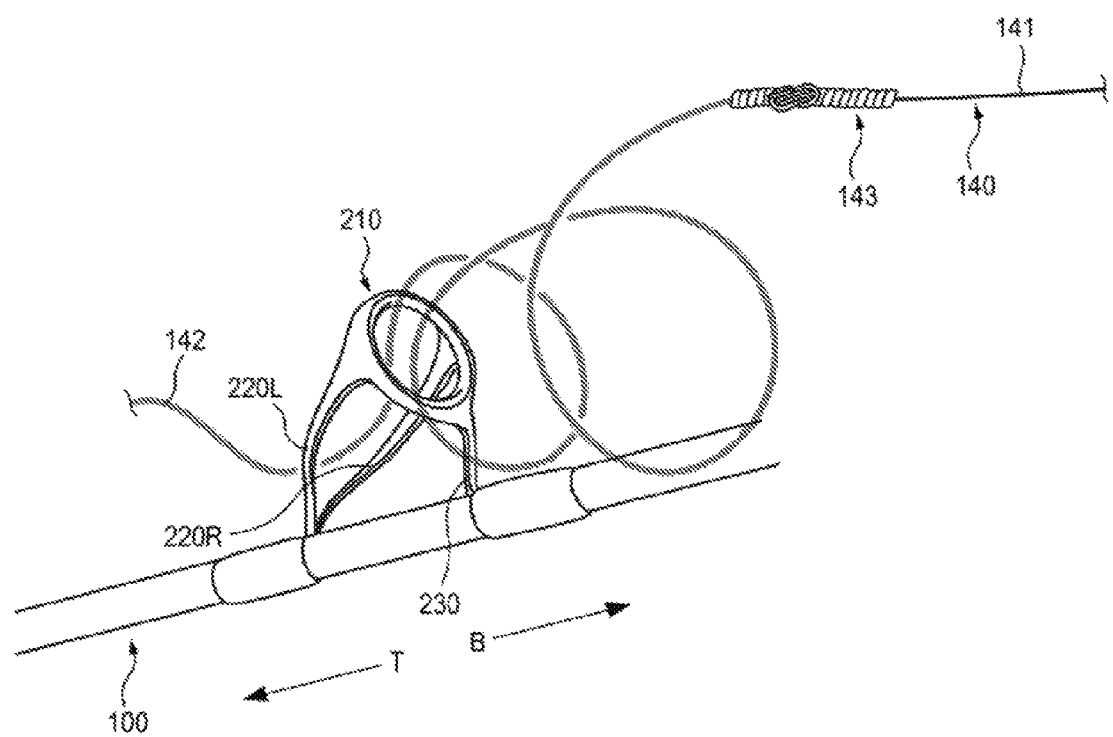

FISHING LINE GUIDE AND FISHING ROD INCLUDING SAME

CROSS-REFERENCE TO RELATED APPLICATIONS

This application is a 35 U.S.C §371 national stage filing of International Application No. PCT/JP2014/073028, filed on Sep. 2, 2014, which claims the benefit of Korean Patent Application No. 2013-0108608, filed on Sep. 10, 2013 and Korean Patent Application No. 2014-0048211, filed on Apr. 22, 2014, the entire contents of each of which are incorporated by reference herein.

TECHNICAL FIELD

The present disclosure relates to a fishing line guide which is attached to a fishing rod and guides a fishing line, and a fishing rod to which the fishing line guide is mounted.

BACKGROUND

To guide a fishing line during casting a fishing rig or during fishing, a fishing line guide is attached to a fishing rod. The fishing line moves through the fishing line guide. Thus, if the fishing line is caught by the fishing line guide, the fishing line becomes tangled at the fishing line guide. It is important that the fishing line guide must be designed to untangle such tangling of the fishing line.

A "PE line," which is widely used in recent years, may be considered as one factor causing the fishing line to become tangled. The PE line consists of polyethylene multifilaments having ultrahigh molecular weight. The PE line has a strength higher than a nylon line or a fluorocarbon line. However, dissimilar to a monofilament line, the PE line is what is called a braided line. Thus, the PE line is not tight and is very pliable. Therefore, when compared with convention fishing lines, the PE line tends to cause tangling of the fishing line. Further, the PE line has little expansion and has difficulties in absorbing impact when tension is applied to the PE line. To absorb the impact, a monofilament line (leader) which has a diameter larger than the PE line is tied to a tip end of the PE line through a tie portion. Since the leader is thicker than the PE line, the tie portion has a shape bigger and thicker than the PE line. Therefore, the fishing line having such a tie portion is easily caught by the fishing line guide during the casting of a fishing rig and tends to cause tangling of the fishing line.

A function of a choke guide among fishing line guides may be considered as another factor causing the fishing line to become tangled. When a fishing rig is cast, the choke guide straightens the fishing line which is spirally reeled out from a reel. Thus, the choke guide applies much resistance to the fishing line. Because of the aforementioned function of the choke guide, the fishing line often becomes tangled at the choke guide.

Patent Document 1: Japanese Patent Registration Publication No. 4755670
Patent Document 2: Japanese Patent Application Publication No. 2000-253778
Patent Document 3: Japanese Design Registration Publication No. 1037054
Non-Patent Document 1: General Catalog 2006 of FUJI KOGYO CO., LTD. (Published on Jan. 20, 2006, Page 13)

SUMMARY

Japanese Patent Registration Publication No. 4755670 discloses a fishing line guide which is designed to untangle a tangled fishing line when the fishing line is wound with the fishing line guide before passing through a guide ring. However, the fishing line guide disclosed by this document is not satisfactory enough to be used for a choke guide.

A fishing line guide of a prior art is described with reference to FIGS. 1A to 1C. The fishing line guide 20 has a guide ring 21 guiding a fishing line 14 and a pair of lateral support legs 22L and 22R extending from the guide ring 21 toward a reel of a fishing rod 10. Since the lateral support legs 22L and 22R face toward the reel, the fishing line 14 spirally reeled out from the reel comes into intermittent contact with the lateral support legs 22L and 22R (see a portion denoted by CP1 in FIGS. 1A and 1C), and therefore the fishing line 14 is apt to wear. Further, as shown in FIG. 1C, in the fishing line guide 20 of the prior art, the guide ring 21 and the lateral support leg 22L, 22R are inclined in the approximately same direction and an angle $\alpha 1$ included between the guide ring and the lateral support leg is very small. Thus, a narrow gap G exists between the guide ring and the lateral support leg. If the fishing line 14 is fitted to such a narrow gap G, then tangling of the fishing line occurs. Since a tie portion 14c tying a PE line 14a and a leader 14b together is firmly tied so as not to be untied, the tie portion 14c hardens. Thus, when a large resistance is applied to the fishing line while the fishing line is being straightened, the tie portion 14c is apt to move irregularly. In particular, if the tie portion 14c is fitted to the gap G between the guide ring 21 and the lateral support leg 22L, 22R, it is very difficult to untangle the tangled the fishing line 14.

To untangle the tangled fishing line, the fishing line guide must be designed so as not to hinder the movement of the fishing line. However, the fishing line guide of the prior art is not sufficient to achieve a smooth movement of the fishing line. FIGS. 2A to 2D show a fishing line guide of a prior art included in the catalog of FUJI KOGYO CO., LTD., further showing an example where the movement of a fishing line is hindered when the tangled fishing line is untangled.

Referring to FIG. 2A, a concavity 34 is formed between a guide ring 31 and a support leg 33. Therefore, the fishing line 14 is caught by a lower end of the guide ring 31 and is hindered from moving toward the guide ring 31. Referring to FIG. 2B, an angle $\alpha 2$ included between support legs 32L and 32R and the fishing rod 10 is small. Therefore, the fishing line 14 is caught between the support legs and the fishing rod and is hindered from moving. Referring to FIGS. 2C and 2D, an outer periphery of the guide ring 31 has a circular arc formed over a wide range. In such a case, the fishing line 14 fails to go over the outer periphery of the guide ring 31 and does not move toward a top of the guide ring 31. Rather, the fishing line 14 moves to the back of the guide ring 31 and is caught by the guide ring 31 (see dashed lines in FIG. 2C). Thus, the movement of the fishing line is hindered.

FIGS. 3A to 3C show a fishing line guide of a prior art disclosed by Japanese Design Registration Publication No. 1037054. The fishing line guide disclosed by this document is also unsatisfactory to be used as a choke guide. Referring to FIG. 3A, a fishing line guide 40 has a pair of rear support legs 43L and 43R extending from a guide ring 41 toward a reel, and a gap 44 exists between the rear support legs 43L and 43R. If the tie portion 14c of the fishing line enters the gap 44, it is difficult for the tie portion 14c to escape from the gap 44, thus causing the fishing line to become tangled.

As to fishing using a fishing line consisting of the PE line and the leader, there is an example of casting a heavy sinker of approximately 100 g at about 100 m, i.e. an example of casting a fishing rig with a large load. In such an example of fishing, it is not easy to straighten the spiral fishing line. Further, even after the fishing line passes through the guide ring of the fishing line guide, the fishing line is not completely straightened and the trace of the fishing line takes a somewhat spiral shape. In such a case, in order not to increase the resistance applied to the fishing line, the fishing line guide must be designed such that the fishing line does not contact the support leg which extends from the lateral of the guide ring. However, as shown in FIGS. 3B and 3C, the lateral support legs 42L and 42R, which extend from the lateral portion of the guide ring 41 toward the tip of the fishing rod, extend from the guide ring 41 such that they are located inside an outermost line seen from the guide ring 41 when the guide ring 40 is viewed from the front. Thus, a portion of the fishing line which somewhat takes a spiral shape after passing through the guide ring 41 (e.g., the leader 14b in FIGS. 3B and 3C) comes into contact with the rear support legs 43L and 43R (see portions denoted by CP2 in FIGS. 3B and 3C), thereby applying resistance to the fishing line and decreasing a casting distance of a fishing rig.

Further, in the aforementioned example of casting the fishing rig with a large load, a large impact is applied to the choke guide straightening the fishing line and therefore the choke guide vibrates due to such an impact. In such an example of fishing, the vibration of the choke guide needs to be suppressed and the choke guide must have high rigidity to decrease the deflection of the choke guide. However, the choke guide of the prior art is unsatisfactory in terms of the deflection decrease. For example, in the choke guide shown in FIG. 4, which is disclosed by Japanese Patent Application Publication No. 2000-253778, a support leg 52L extending from a guide ring 51 has a long length L. Thus, the choke guide cannot have sufficient rigidity and the entire choke guide may vibrate due to the deflection of the support leg 52L. This may be the cause of disadvantageous casting.

Embodiments of the present disclosure solve the aforementioned problems of the prior art. Embodiments of the present disclosure provide a fishing line guide, which reduces the wear of the fishing line, smoothly untangles the tangled fishing line by decreasing the resistance applied to the fishing line, and has high rigidity, and provide a fishing rod including such a fishing line guide.

One aspect of the present disclosure provides a fishing line guide that is attached to a fishing rod and guides a fishing line. In an exemplary embodiment, the fishing line guide includes: a guide ring guiding a fishing line; a pair of lateral support legs extending from both diametrically opposing lateral side of the guide ring toward a tip of a fishing rod respectively and approaching each other at a lower end, the pair of lateral support legs including, at the lower end thereof, a first attachment portion for attachment to a rod body of the fishing rod; and one rear support leg extending from an underside of the guide ring and including, at a lower end thereof, a second attachment portion for attachment to the rod body of the fishing rod. When viewing the fishing line guide from front, the guide ring has an outer contour, the lateral support legs have an outer contour joining to the outer contour of the guide ring at a first join point, and the rear support leg has an outer contour joining to the outer contour of the guide ring. When viewing the fishing line guide from side, the guide ring has a rear contour facing toward a butt of the fishing rod, the lateral support legs have an upper contour joining to the outer contour of the guide ring at the first join point and a lower contour joining the outer contour of the guide ring at a second join point, and the rear support leg has a rear contour joining to the rear contour of the guide ring and facing toward the butt of the fishing rod. The rear contour of the guide ring is inclined at a first angle toward the tip of the fishing rod with respect to a vertical line which is vertical to a first horizontal line touching lower surfaces of the first and second attachment portions. The rear contour of the rear support leg is inclined with respect to the vertical line at an angle equal to or less than the first angle with respect to the rear contour of the guide ring. When viewing the fishing line guide from the front, the outer contour of the lateral support legs is inclined at an angle of 45 degrees or more and 90 degrees or less with respect to the first horizontal line at an intersection point to the lower surface of the first attachment portion. When viewing the guide ring in an orthogonal direction, the outer contour of the guide ring comprises a circular arc which is centered at a center of the guide ring and has two end points located below at a second angle with respect to the center of the guide ring, and a straight line or a first curve line, which has a center located outside the outer contour of the guide ring, between the end point of the circular arc and the outer contour of the rear support leg. When viewing the guide ring in the orthogonal direction, the first join point is located above the center of the guide ring at a third angle with respect to the center of the guide ring, and the second join point is located below the center of the guide ring.

In an embodiment, the rear contour of the rear support leg extends from the rear contour of the guide ring at an angle equal to or less than the first angle. The rear contour of the rear support leg may be perpendicular to the first horizontal line.

In an embodiment, the first angle is in a range of 5 degrees to 20 degrees, the second angle is in a range of 30 degrees to 45 degrees, and the third angle is in a range of 25 degrees to 40 degrees.

In an embodiment, the outer contour of the lateral support legs comprises a second curve line extending upward from the intersection point of the lower surface of the first attachment portion, and a third curve line extending from the second curve line to the first join point. When viewing the fishing line guide from the front, the second curve line has a center located outside the outer contour of the lateral support legs and the third curve line has a center located inside the outer contour of the lateral support legs. When viewing the fishing line guide from the front, the fishing line guide has a maximum width in a range of the third curve line.

In an embodiment, the fishing line guide has the maximum width above a third horizontal line which bisects a height between the first horizontal line and a second horizontal line passing through the center of the guide ring parallel to the first horizontal line. The second curve line is located below the third horizontal line In an embodiment, the upper contour of the lateral support legs comprises a fourth curve line extending upward from the first attachment portion, and a fifth curve line extending from the fourth curve line to the first join point and existing in the range of the third curve line of the outer contour of the lateral support legs. When viewing the fishing line guide from the side, the fourth curve line has a center located further toward the butt of the fishing rod than the upper contour, the fifth curve line has a center located further toward the tip of the fishing rod than the upper contour, and a tangent line at an intersection between the fourth curve line and the fifth curve line is inclined at a fourth angle toward the butt of the fishing rod with respect to the vertical line.

In such an example, the upper contour of the lateral support legs may further comprise a straight line which is inclined at the fourth angle between the fourth curve line and the fifth curve line. The fourth angle is in a range of 30 degrees to 60 degrees. Further, the fifth curve line is located above a fourth horizontal line passing through the maximum width parallel to the first horizontal line.

In an embodiment, the outer contour and the upper contour of the lateral support legs have an S-like shape. In an embodiment, a length between an end of the first attachment portion toward the tip of the fishing rod and an end of the second attachment portion toward the butt of the fishing rod is less than a height between the first horizontal line and an upper end of the guide ring.

In an embodiment, the lateral support legs have an opening adjacent to the guide ring. In an embodiment, the first attachment portion and the second attachment portion has a shape of a ring.

Another aspect of the present disclosure provides a fishing rod including one or more of the above-described fishing line guides.

In the fishing line guide according to the embodiments, the guide ring does not have a circular arc shape in a lower periphery, the lateral support legs are curved in an S-like shape when viewing the fishing line guide from the front and the side, and a single rear support leg is bent vertically to the fishing rod with respect to the guide ring toward the tip of the fishing rod. With the aforementioned guide ring, lateral support legs and rear support leg, the fishing line guide can reduce the wear of the fishing line, easily untangle the tangled fishing line by decreasing the resistance of the fishing line, and have a short overall length. Further, the lateral support legs of the fishing line guide extend upward at an angle of 45 degrees or more with respect to the horizontal line when viewing the fishing line guide from the front, and the lateral support legs are curved in an S-like shape when viewing the fishing line guide from the side. Thus, the lateral support legs have high resistance against bending. Further, the rigidity of the fishing line guide can increase and the deflection of the fishing line guide can decrease.

BRIEF DESCRIPTION OF THE DRAWINGS

FIG. 1C is a view showing an example of a fishing line guide of a prior art.
FIG. 3B is a view showing another example of a fishing line guide of a prior art.
FIG. 3C is a view showing another example of a fishing line guide of a prior art.
FIG. 20A is a view illustrating that a tie portion of the fishing line is not caught by the fishing line guide according to an embodiment.

DETAILED DESCRIPTION

Figure 1A:
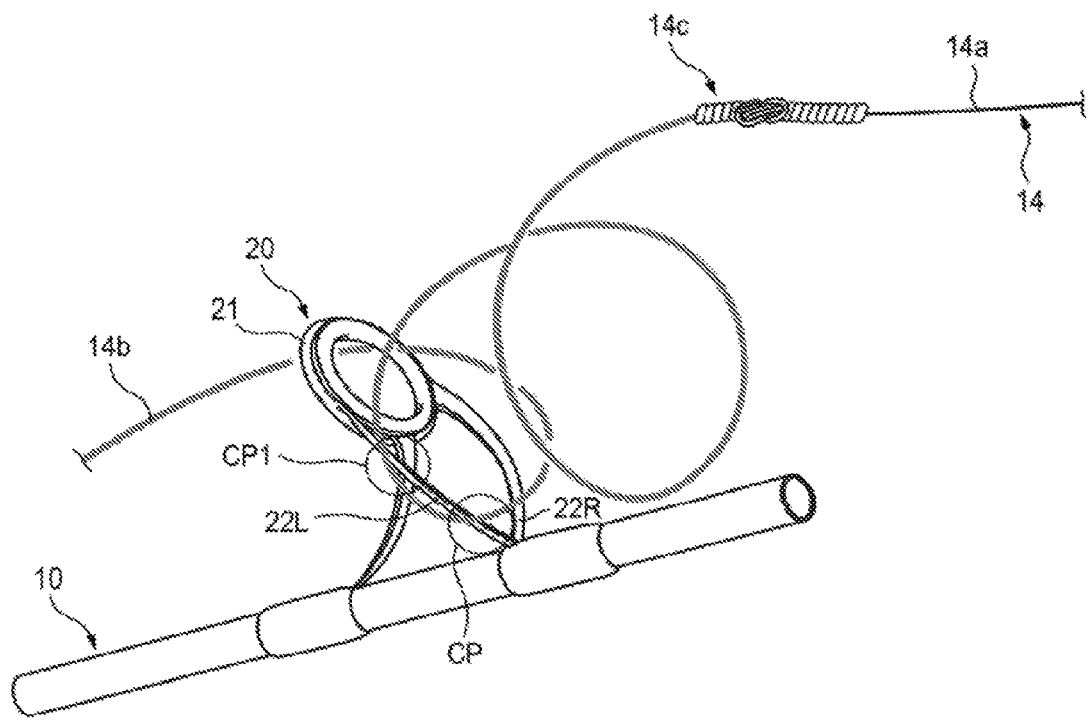
FIG. 1A is a view showing an example of a fishing line guide of a prior art.
Figure 1B:
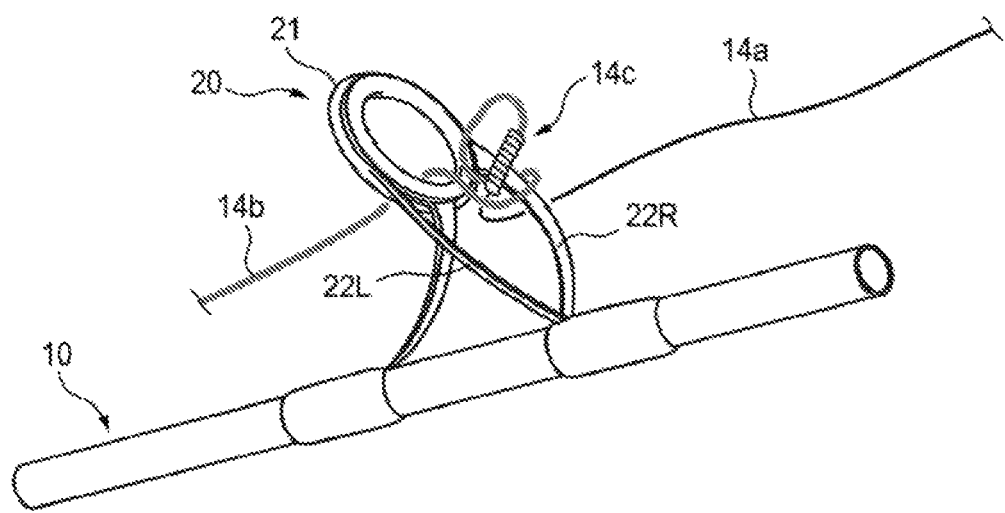
FIG. 1B is a view showing an example of a fishing line guide of a prior art.
Figure 2A:
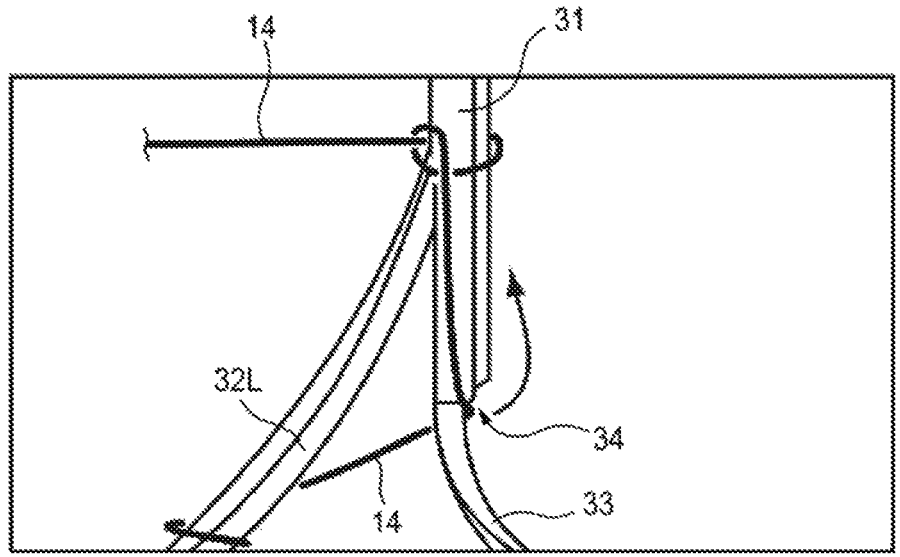
FIG. 2A is a view showing an example where a fishing line is caught by a fishing line guide of a prior art.
Figure 2B:
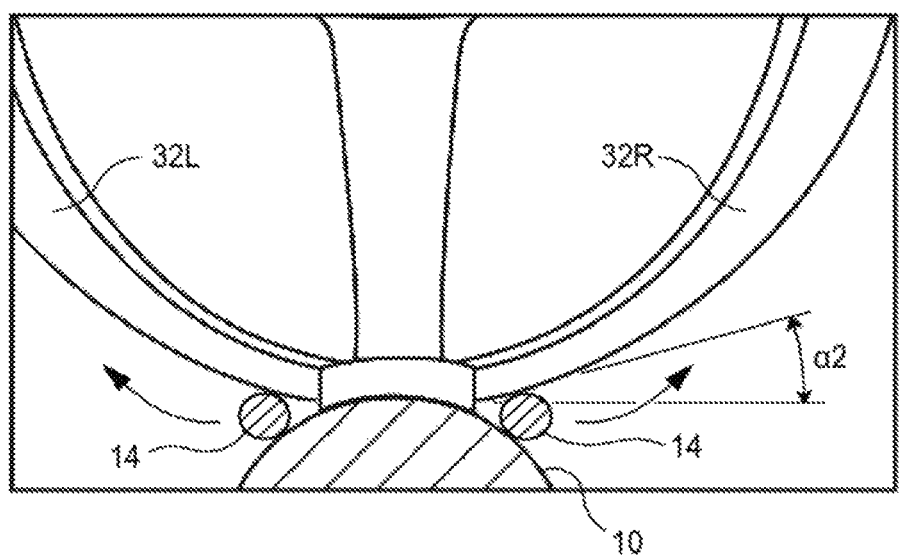
FIG. 2B is a view showing an example where a fishing line is caught by a fishing line guide of a prior art.
Figure 2C:
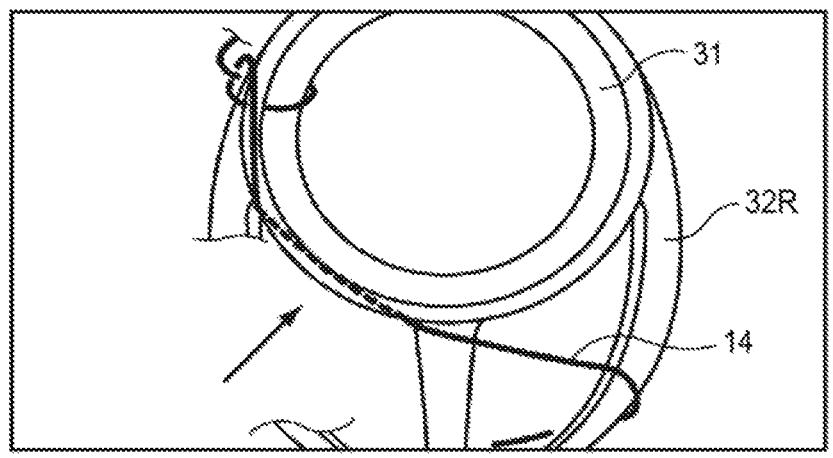
FIG. 2C is a view showing an example where a fishing line is caught by a fishing line guide of a prior art.
Figure 2D:
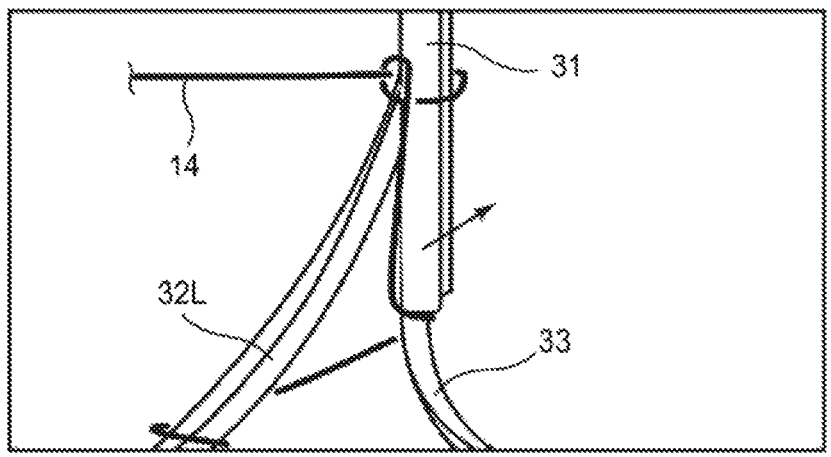
FIG. 2D is a view showing an example where a fishing line is caught by a fishing line guide of a prior art.
Figure 3A:
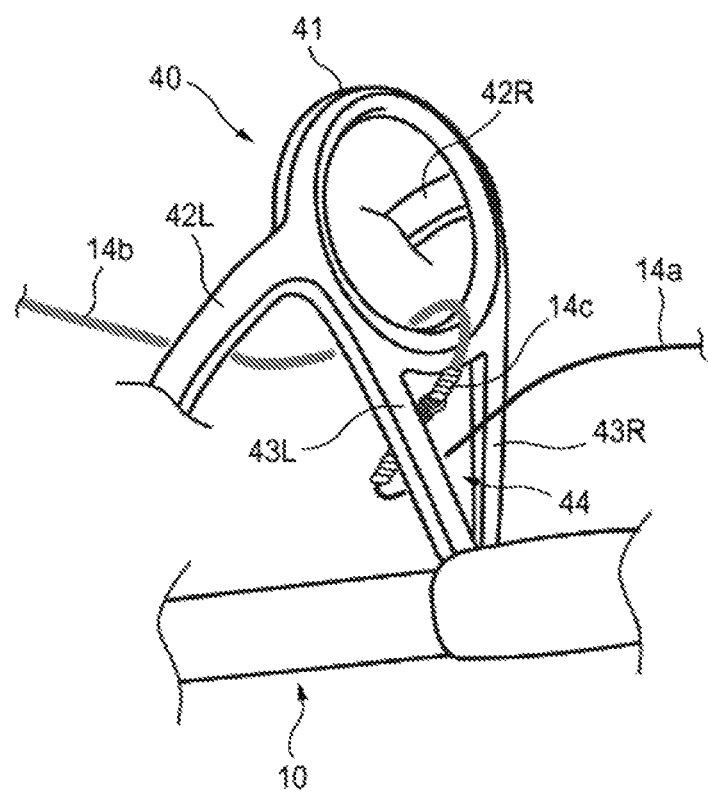
FIG. 3A is a view showing another example of a fishing line guide of a prior art.
Figure 4:
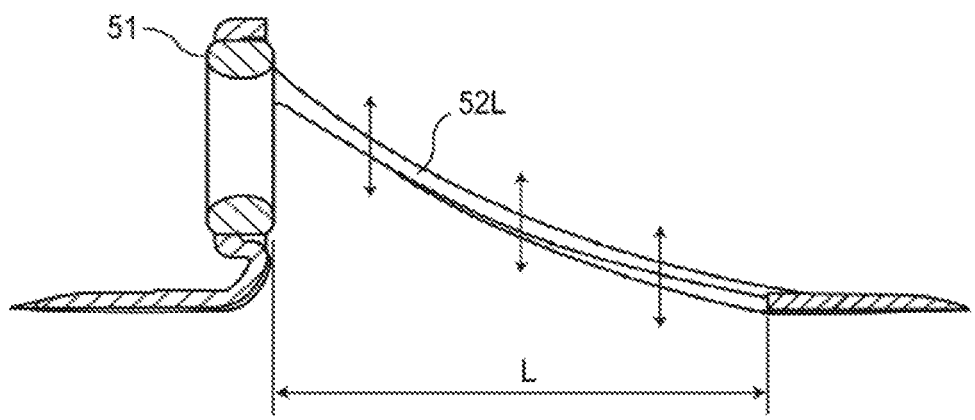
FIG. 4 is a view showing a further example of a fishing line guide of a prior art.

Descriptions are made as to embodiments of a fishing line guide according to the present disclosure and embodiments of a fishing rod including the same according to the present disclosure with reference to the accompanying drawings. Like reference numerals in the drawings denote like or corresponding elements or parts.

The directional term "frontward," "front" or the like as used herein means a direction directed toward a tip of a fishing rod, while the directional term "rearward," "rear" or the like means a direction directed toward a butt of a fishing rod. Further, as used herein, the directional term "upward," "upper" or the like is based on a direction in which a guide ring is positioned with respect to an attachment portion of a support leg, while the directional term "downward," "lower" or the like means a direction opposite to the upward or upper direction.

Further, the term "contour" as used herein refers to a line that is seen at the outermost edge of the element of a fishing line guide in the front or side view of the fishing line guide. For example, an "outer contour" refers to a line that is located at the outermost edge of the element when viewing the fishing line guide from the front. An "upper contour" refers to a line that is located at the uppermost edge of the element when viewing the fishing line guide from the side. A "lower contour" refers to a line that is located at the lowermost edge of the element when viewing the fishing line guide from the side. A "rear contour" refers to a line that is located at the rearmost edge of the element when viewing the fishing line guide from the side.

Figure 5:
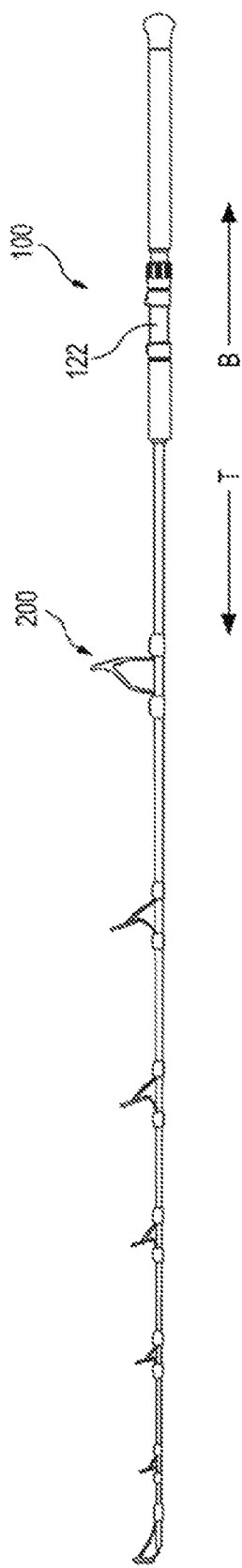
FIG. 5 is a side view of a fishing rod according to an embodiment.
Figure 6:
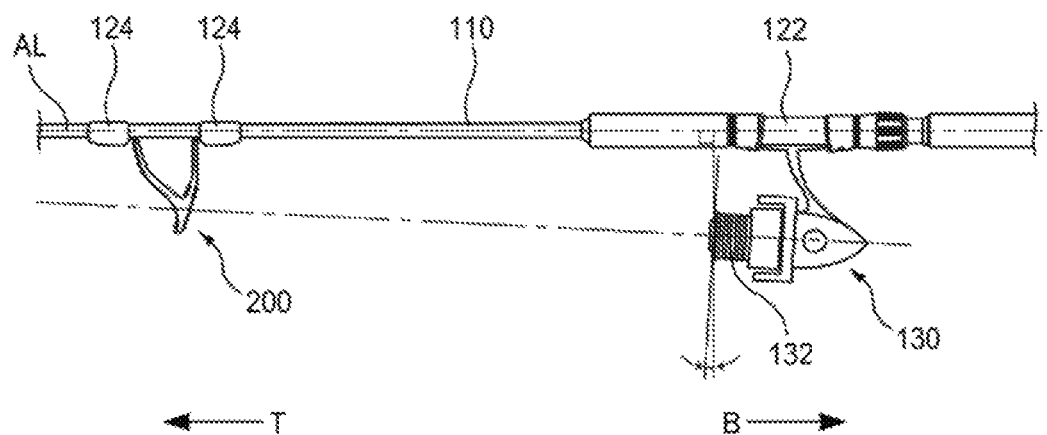
FIG. 6 is a side view showing a portion of the fishing rod shown in FIG. 5.
Figure 7:
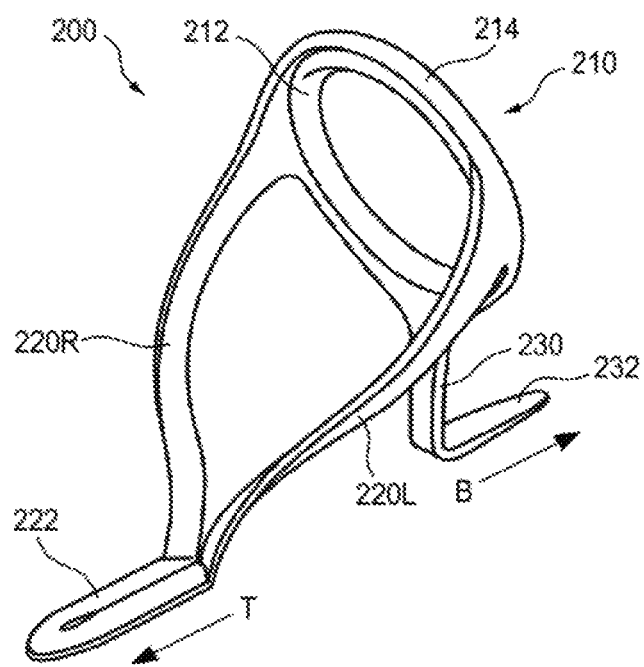
FIG. 7 is a perspective view showing a fishing line guide according to an embodiment.
Figure 8:
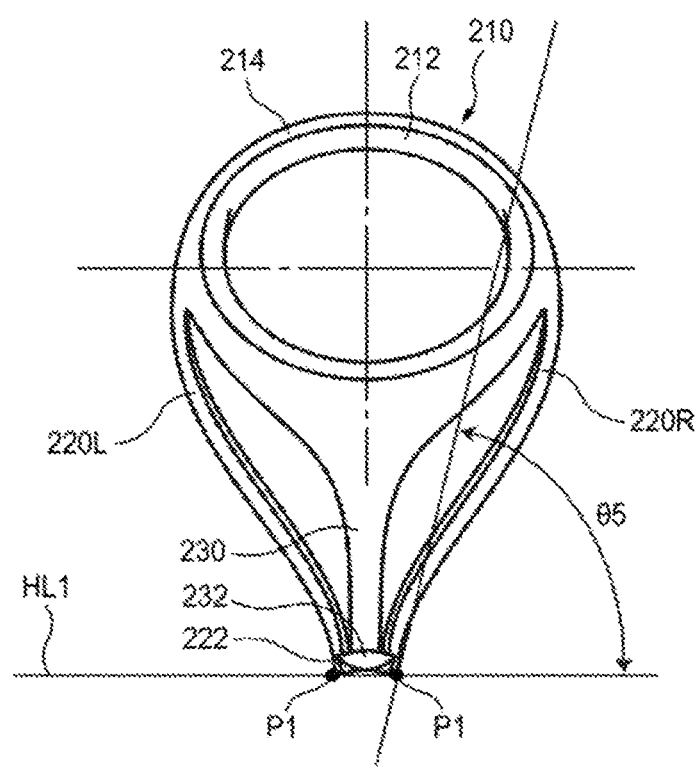
FIG. 8 is a front view of the fishing line guide shown in FIG. 7.

FIGS. 5 and 6 show a fishing rod according to an embodiment. In FIGS. 5 and 6, an arrow T indicates the direction directed toward a tip of a fishing rod, while an arrow B indicates directed toward a butt of a fishing rod. The fishing rod 100 includes one or more fishing line guides according to an embodiment.

The fishing rod 100 has a thin and elongated rod body 110. The fishing rod 100 has a reel seat 122 for attachment of a reel 130 at a rearward portion of the rod body 110. The reel 130 has a spool 132 around which a fishing line is wound. The reel 130 is mounted to the reel seat 122 such that a front end surface of the spool 132 is inclined at a predetermined angle (e.g., 4 degrees to 5 degrees) with respect to a line perpendicular to an axial line AL of the fishing rod. The fishing line guide 200 according to an embodiment is attached to the rod body 110 in the front of the reel seat 122. The fishing line guide 200 is attached to the rod body 110 by bringing its attachment portion into close contact with the rod body 110 of the fishing rod and then closely winding a winding thread around the attachment portion and the rod body 110. Further, an adhesive is applied on the winding thread wound around the rod body 110, thus forming a coating layer 124.

Descriptions are made as to embodiments of the fishing line guide attached to the fishing rod 100 with reference to FIGS. 7 to 23. The fishing line guides 200, 300, 400 and 500 according to embodiments are a part for straightening and guiding a fishing line spirally reeled out from the reel 130 during casting a fishing rig. The fishing line guides according to embodiments may be referred to as a "choke guide" in the art. One or more fishing line guides 200, 300, 400, 500 may be attached to the fishing rod 100 as a choke guide. The fishing line guide 200, 300, 400, 500 according to an embodiment includes: a guide ring through which the fishing line passes, the guide ring having a substantially circular shape; a pair of lateral support legs extending from both diametrically opposing lateral sides of the guide ring toward a tip of the fishing rod respectively; and one rear support leg extending from an underside of the guide ring with a predetermined spacing from the lateral support legs. The lateral support legs and the rear support leg include, at their lower ends, an attachment portion for attachment to the fishing rod.

The fishing line guide 200 according to one embodiment is described with reference to FIGS. 7 to 12. The fishing line guide 200 includes: a guide ring 210 through which the fishing line passes; a pair of lateral support legs 220L and 220R extending from both diametrically opposing lateral sides of the guide ring 210 toward a tip of the fishing rod 100 (in the direction indicated by the arrow T) respectively; and one rear support leg 230 extending from an underside of the guide ring 210 as being spaced from the lateral support legs 220L and 220R. The aforementioned parts constituting the fishing line guide 200 are made of a metallic material and may be formed, for example, by pressing.

The guide ring 210 is substantially circular and has therein a circular opening through which the fishing line passes. When the fishing rig is cast, the fishing line is straightened while passing through the opening and is guided by the guide ring 210.

The guide ring 210 includes a hard ring 212 and a retaining ring 214 for retaining the hard ring 212. The hard ring 212 is substantially circular and defines therein said opening of the guide ring 210. The hard ring 212 is contacted with the fishing line during fishing or casting the fishing rig. The hard ring 212 is made of a hard material having superior wear resistance such as ceramic, metal, etc. The retaining ring 214 is substantially circular. The hard ring 212 is fitted to an inner peripheral surface of the retaining ring 214 and is thus retained by the retaining ring 214. While the guide ring 210 of this embodiment includes the hard ring 212 through which the fishing line passes and the retaining ring 214 retaining the hard ring 212, the guide ring 210 may include a single circular ring-shaped part insofar as required strength, hardness, wear resistance and the like are satisfied.

A pair of the lateral support legs 220L and 220R are symmetrically formed relative to a perpendicular passing through a center of the guide ring 210. The pair of the lateral support legs 220L and 220R extend from the both diametrically opposing lateral sides of the guide ring 210 respectively. For example, when viewing the fishing line guide 200 from the front (when viewing the fishing line guide 200 from the butt of the fishing rod 100 along the axial line AL), the lateral support leg 220L extends from a left edge of the guide ring 210 (a left edge of the retaining ring 214) toward the tip of the fishing rod, and the lateral support leg 220R extends from a right edge of the guide ring 210 (a right edge of the retaining ring 214) toward the tip of the fishing rod. The lateral support legs 220L and 220R extend as being curved in a predetermined shape and approach each other at the vicinity of their lower ends. In this embodiment, when viewing the fishing line guide 200 from the front, the lateral support legs 220L and 220R are curved, for example, in an S-like shape. Further, when viewing the fishing line guide 200 from the side (when viewing the fishing rod 100 from the side), the lateral support legs 220L and 220R are curved, for example, in an S-like shape. In other words, the lateral support legs 220L and 220R are curved in an S-like shape when viewing the fishing line guide 200 from the front and the side.

The lateral support leg 220L, 220R includes, at a lower end, a first attachment portion 222 for attachment to the rod body 110 of the fishing rod. In this embodiment, the first attachment portion 222 has a shape of a flat and elongated foot. The first attachment portion 222 has a lower surface 222a that is in contact with an outer peripheral surface of the rod body 110 of the fishing rod. The lower surface 222a of the first attachment portion 222 may be formed flat or concavely with a little curvature.

The rear support leg 230 extends from the underside of the guide ring 210 (from an underside of the retaining ring 214) as being spaced from the lateral support legs 220L and 220R at a predetermined distance. When viewing the fishing line guide 200 from the front, the rear support leg 230 linearly extends from the guide ring 210. When viewing the fishing line guide 200 from the side, the rear support leg 230 is inclined at a predetermined angle with respect to the guide ring 210. The inclination angle of the rear support leg 230 with respect to the guide ring 210 may be determined within a range in which the rear support leg 230 is perpendicular to the axial line AL of the fishing rod 100.

The rear support leg 230 includes, at a lower end, a second attachment portion 232 for attachment to the rod body 110 of the fishing rod. In this embodiment, the second attachment portion 232 has a shape of a flat and elongated foot. The second attachment portion 232 has a lower surface 232a that is in contact with the outer peripheral surface of the rod body 110 of the fishing rod. The lower surface 232a of the second attachment portion 232 may be formed flat or concavely with a little curvature.

Figure 11A:
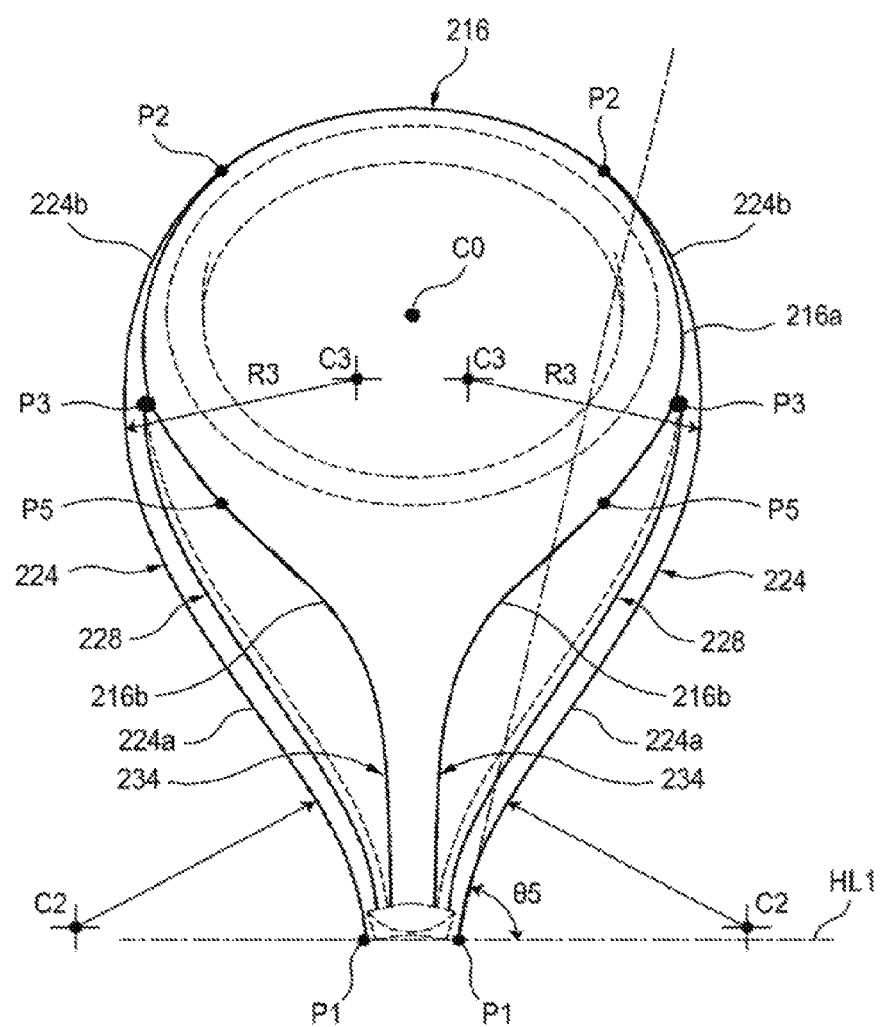
FIG. 11A is a view showing contours of elements of the fishing line guide.
Figure 11B:
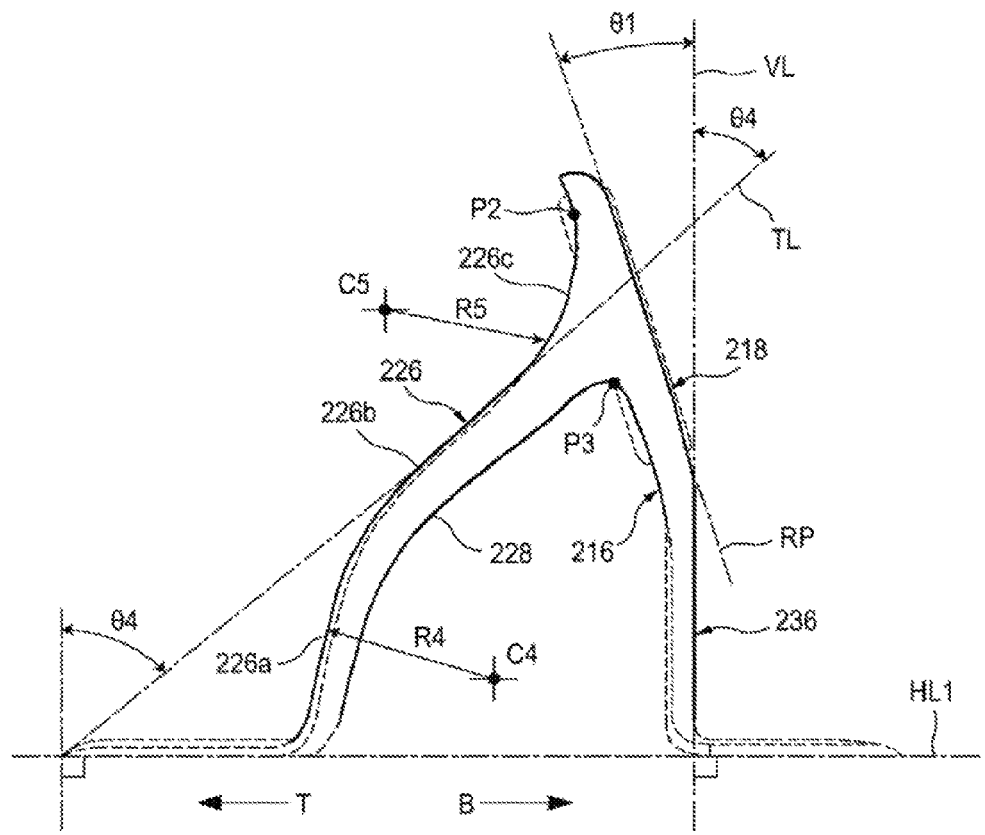
FIG. 11B is a view showing contours of elements of the fishing line guide.
Figure 11C:
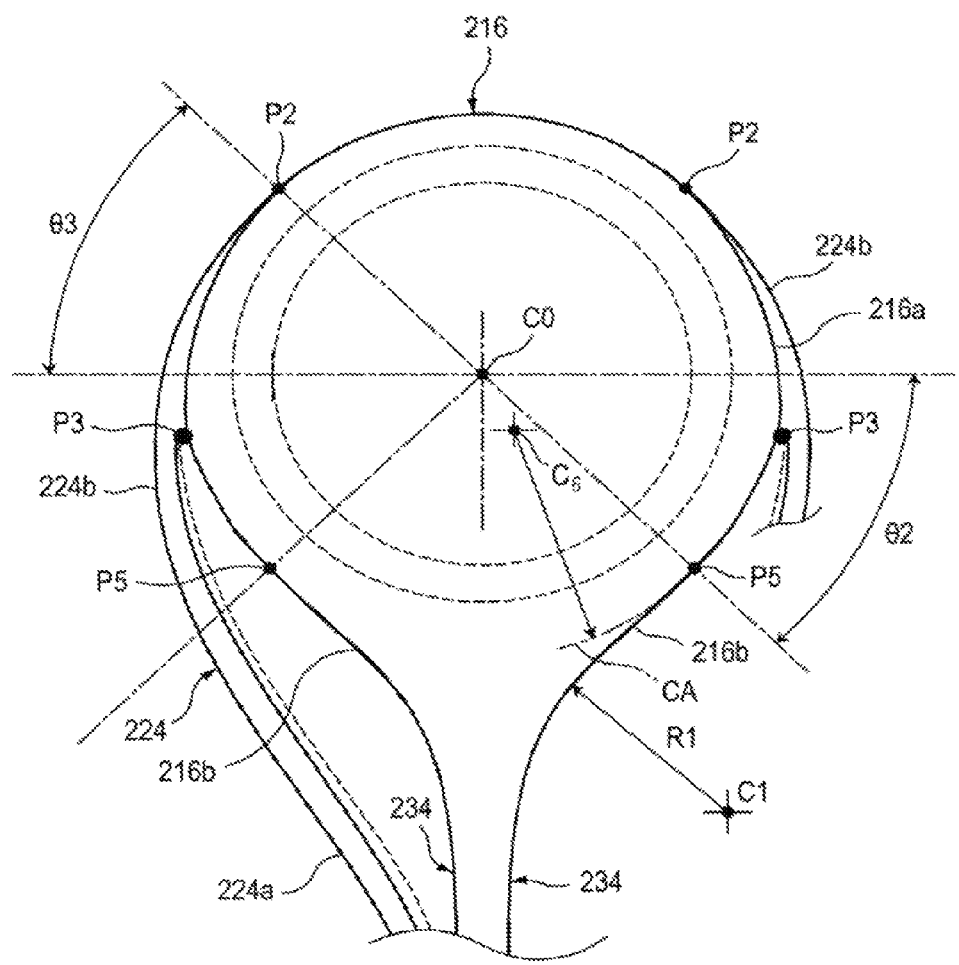
FIG. 11C is a view showing contours of elements of the fishing line guide.

The fishing line guide 200 according to the embodiment straightens the fishing line (what is called "choke") when the fishing rod is swung to cast a fishing rig. Further, the fishing line guide 200 according to the embodiment untangles the tangling of the fishing line which may be caused by the fishing line being wound around the fishing line guide 200. Untangling of the tangled fishing line can be achieved through the shape of the elements constituting the fishing line guide 200, for example by the contours of the elements of the fishing line guide 200. FIGS. 11A to 11C show the contours of the guide ring 210, the lateral support legs 220L and 220R and the rear support leg 230 which constitute the fishing line guide 200.

Referring to FIGS. 11A to 11C, when viewing the fishing line guide 200 from the front, the guide ring 210 has an outer contour 216, and the lateral support legs 220L and 220R have an outer contour 224, and the rear support leg 230 has an outer contour 234. The outer contour 224 of the lateral support leg 220L, 220R joins to the lower surface 222a of the first attachment portion 222 at an intersection point P1 and joins to the outer contour 216 of the guide ring 210 at a first join point P2. The outer contour 234 of the rear support leg 230 joins to the outer contour of the guide ring 210.

Further, when viewing the fishing line guide 200 from the side, the guide ring 210 has a rear contour 218, the rear support leg 230 has a rear contour 236, and the lateral support legs 220L and 220R have an upper contour 226 and a lower contour 228. The rear contour 218 of the guide ring 210 faces to the butt of the fishing rod (in the direction of the arrow B). The rear contour 236 of the rear support leg 230 faces to the butt of the fishing rod (in the direction of the arrow B) and joins to the rear contour 218 of the guide ring 210. The upper contour 226 of the lateral support legs 220L and 220R is located between the upper surface 222b of the first attachment portion 222 and the guide ring 210, and joins to the outer contour 216 of the guide ring 210 at the first join point P2. The lower contour 228 of the lateral support legs 220L and 220R is located between the lower surface 222a of the first attachment portion 222 and the guide ring 210, and joins to the outer contour 216 of the guide ring 210 at a second join point P3. The lower contour 228 of the lateral support legs 220L are 220R is similar to the upper contour 226.

Figure 9:
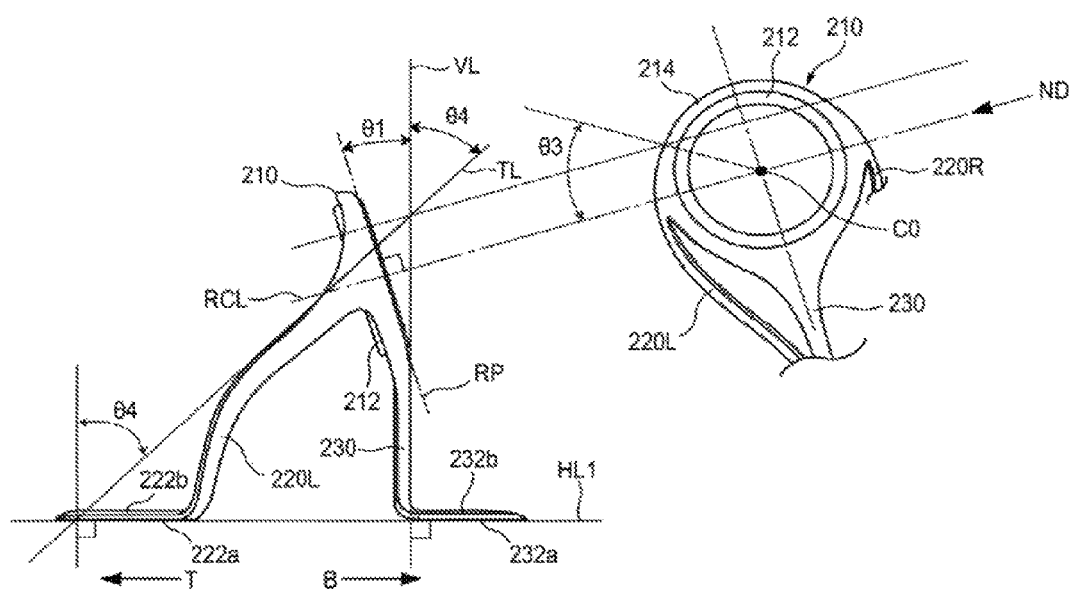
FIG. 9 is a view showing a side view of the fishing line guide shown in FIG. 7 and a view taken when a guide ring is viewed in an orthogonal direction in the front view of the fishing line guide.
Figure 10:
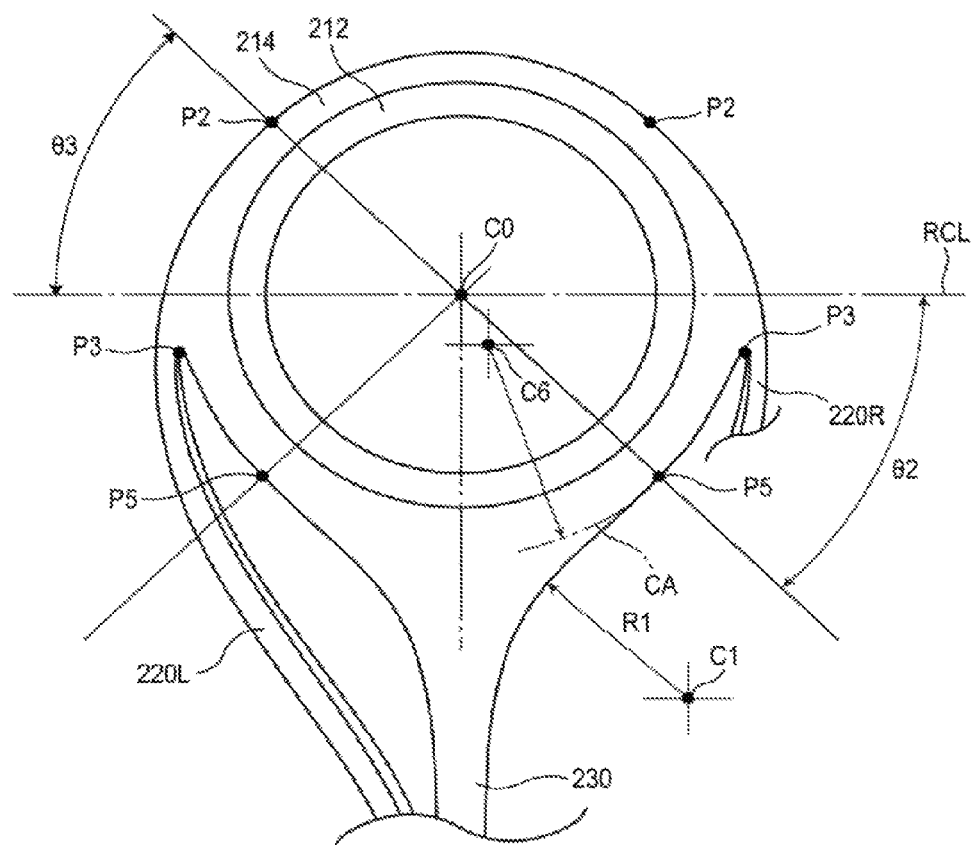
FIG. 10 is a view taken when the guide ring is viewed in the orthogonal direction in the front view of the fishing line guide.

In the fishing line guide according to the embodiment, the guide ring 210 is inclined toward the tip of the fishing rod 100. Thus, when viewing the fishing line guide 200 from the front (when viewing the fishing line guide 200 from the butt of the fishing rod 100 along the axial line AL), the guide ring 210 is seen in an elliptical shape, not a circular shape. For description on the shape feature of the fishing line guide 200, reference is made to a view which is taken when viewing the guide ring 210 in a direction orthogonal to the guide ring 210. The retaining ring 214 constituting the guide ring 210 is circular and is approximately flat when viewed from the side. Since an upper surface of the retaining ring 214 is flat, the guide ring 210 is seen in a circular shape when viewing the upper surface of the retaining ring 214 in a direction perpendicular or orthogonal thereto (in a direction of an arrow ND in FIG. 9). Herein, the flat upper surface of the retaining ring 214 is referred to as a "ring plane RP." Further, viewing the guide ring 210 in the direction orthogonal to the ring plane RP is referred to as "when viewing the guide ring in the orthogonal direction." FIGS. 9, 10 and 11C show the view taken when the guide ring 210 is viewed in the orthogonal direction. Further, FIG. 11B shows that the rear contour 218 of the guide ring 210 is located in the ring plane RP.

The shape features of the respective elements of the fishing line guide 200 are described with reference to FIGS. 7 to 12.

When viewing the fishing line guide 200 from the side (see FIGS. 9, 11B and 12), the guide ring 210 is inclined at a first angle Θ1 toward the tip of the fishing rod 100 (in the direction of the arrow T). That is, the rear contour 218 of the guide ring 210 is inclined at the first angle Θ1 toward the tip of the fishing rod 100 with respect to a vertical line VL vertical to a first horizontal line HL1. Herein, the first horizontal line HL1 is a straight line that touches both the lower surface 222a of the first attachment portion 222 and the lower surface 232a of the second attachment portion 232. The first horizontal line HL1 is parallel to the axial line AL of the rod body 110 of the fishing rod. In the embodiments, the first angle Θ1, at which the guide ring 210 is inclined toward the tip of the fishing rod 100, is 5 degrees or more so as to correspond to the inclination angle of the spool 132 of the reel 130 with respect to the axial line AL of the fishing rod. Further, the first angle Θ1 is 20 degrees or less such that the fishing line, which is spirally reeled out from the reel 130, does not contact the underside of the guide ring 210 due to the difference between said angle of the spool 132 and the inclination angle of the guide ring 210 and thus does not irregularly move when the spiral fishing line enters the guide ring 210.

When viewing the fishing line guide 200 from the front (see FIGS. 9, 10, 11A and 11C), the outer contour 216 of the guide ring 210 (i.e., the outer contour of the retaining ring 214) includes: a segment of a circumference of the retaining ring 214 which is outside the hard ring 212; and a straight line or curve line connecting with the circumferential segment of the retaining ring 214 at an either end of the circumferential segment via an inflection point P5.

The circumferential segment of the retaining ring 214, which forms the outer contour 216 of the guide ring 210, ends at points which are located below a center C0 of the guide ring 210 at a second angle θ2 with respect to the center C0. Thus, the outer contour 216 of the guide ring 210 has a circular arc 216a within a predetermined section. The circular arc 216a is centered at the center C0 of the guide ring 210. The circular arc 216a has two end points which are located below the center C0 at the second angle θ2 with respect to a center line RCL passing through the center C0 of the guide ring 210. The end point of the circular arc 216a becomes the inflection point P5. That is, when viewing the guide ring 210 in the orthogonal direction, the circular arc 216a (the circumferential segment of the retaining ring 214), which forms the outer contour 216 of the guide ring 210, ends at the inflection points P5 and the inflection points P5 are located below the center line RCL passing through the center C0 of the guide ring 210 by the second angle θ2 (see FIGS. 10 and 11C). In the embodiments, the second angle θ2 is in the range of 30 degrees to 45 degrees. If the outer contour 216 of the guide ring 210 has a straight or curve line which touches to the inflection point P5 at the second angle θ2 less than 30 degrees, then a width of a portion which transitions from the guide ring 210 to the rear support leg 230 becomes wide, thereby increasing a weight of the fishing line guide 200 and impairing an appearance of the fishing line guide 200. Further, when the tie portion tying the PE line and the leader together irregularly moves during casting a fishing rig, the tie portion may contact the transition portion. If the outer contour 216 of the guide ring 210 has a straight or curve line which touches the inflection point P5 at the second angle θ2 more than 45 degrees, then a portion of the fishing line moves to a back of the guide ring 210 (a side of the guide ring 210 facing the tip of the fishing rod 100) and may be caught by the guide ring 210.

The outer contour 216 of the guide ring 210 has a straight line or a first curve line 216b from the inflection point P5 of the circular arc 216a to the outer contour 234 of the rear support leg 230. Said straight line forming the outer contour 216 of the guide ring 210 includes a tangential line at the inflection point P5 of the circular arc 216a. Further, the first curve line 216b forming the outer contour 216 of the guide ring 210 is a curve line touching the inflection point P5 of the circular arc 216a and has a center C1, which is located outside the outer contour 216, and a radius of curvature R1. That is, the outer contour 216 of the guide ring 210 includes the circular arc 216a (the circumferential segment of the retaining ring 214) up to the inflection point P5. From the inflection point P5, the outer contour 216 of the guide ring 210 changes to said straight line or said first curve line 216b with the center C1 and the radius of curvature R1, and then joins to the outer contour 234 of the rear support leg 230.

A center C6 shown in FIGS. 10 and 11C is any center which is located inside the outer contour 216 of the guide ring 210. The center C1 shown in FIGS. 10 and 11C is the center of the first curve line 216b which forms the outer contour 216 of the guide ring 210. As described above, when viewing the guide ring 210 in the orthogonal direction, the outer contour 216 of the guide ring 210 does not include a circular arc CA, which has the center C6 inside the outer contour 216 of the guide ring 210, from the inflection point P5 which is located at the second angle θ2 below the center C0 of the guide ring 210. If the outer contour 216 has such a circular arc CA, then a portion of the fishing line moves to the back of the guide ring 210 (the side of the guide ring 210 facing to the tip of the fishing rod) and may be caught by the guide ring 210. Instead, from the inflection point P5, the outer contour 216 of the guide ring 210 includes said straight line tangent to the inflection point P5 or said first curve line 216b which has the center C1 located outside the outer contour 216 of the guide ring 210 and the radius of curvature R1. Thus, from the inflection point P5 which is located below the center C0 of the guide ring 210 by the second angle θ2 (e.g., 45 degrees), the outer contour 216 of the guide ring 210 does not include the circular arc CA which causes the fishing line to be caught by the guide ring 210. In other embodiment, the outer contour 216 of the guide ring 210 may include said straight line within a predetermined section after the inflection point P5 and may include the aforementioned first curve line 216b after said straight line. Further, the first curve line 216b may comprise a plurality of curve lines which have centers and radiuses of curvature located outside the outer contour 216.

In the front view and the side view of the fishing line guide 200, the lateral support legs 220L and 220R are curved in an S-like shape. Thus, when viewing the fishing line guide 200 from the front, the outer contour 224 of the lateral support legs 220L and 220R is curved in an S-like shape. When viewing the fishing line guide 200 from the side, the upper contour 226 of the lateral support legs 220L and 220R is curved in an S-like shape.

The first join point P2, which is between the upper contour 226 of the lateral support leg 220L, 220R and the outer contour 216 of the guide ring 210 when viewing the guide ring 210 from the side, is located above the center C0 of the guide ring 210 when viewing the guide ring 210 in the orthogonal direction. When viewing the guide ring 210 in the orthogonal direction, the first join point P2 between the upper contour 226 of the lateral support leg 220L, 220R and the outer contour 216 of the guide ring 210 is located above the center C0 of the guide ring 210 at a third angle Θ3 with respect to the center C0. In the embodiments, the third angle Θ3 is in the range of 25 degrees to 40 degrees. If the third angle Θ3 is less than 25 degrees, then a portion of the fishing line (e.g., a portion 140d of the fishing line shown in FIGS. 14 to 19B) may be caught again by the guide ring 210 due to frictional resistance during the untangling of the tangled fishing line. Further, in view of the weight and appearance of the fishing line guide 200, the third angle Θ3 is 40 degrees or less.

The second join point P3, which is between the lower contour 228 of the lateral support leg 220L, 220R and the outer contour 216 of the guide ring 210 when viewing the guide ring 210 from the side, is located below the center C0 of the guide ring 210 when viewing the guide ring 210 in the orthogonal direction. If the second join point P3 is located above the center C0 of the guide ring 210, then the circular arc, which causes the fishing line to move to the back of the guide ring 210 (the side facing the tip of the fishing rod 100) during its movement along the guide ring 210 and to be caught by the guide ring 210, may be formed in the outer contour 216 of the guide ring 210 within a considerable range. However, since the second join point P3 is located below the center C0 of the guide ring 210, the range of the aforementioned circular arc decreases, thereby preventing the fishing line from moving to the back of the guide ring 210.

Further, with regard to a straight line or curve line forming the upper contour 226 of the lateral support leg 220L, 220R, a straight line or a tangent line TL of a curve line, which is most inclined toward the butt of the fishing rod 100 (in the direction of the arrow B), is inclined at a fourth angle Θ4 with respect to the vertical line VL toward the butt of the fishing rod 100 when the fishing line guide 200 is viewed from the side (see FIGS. 9 and 11B). In the embodiments, the fourth angle Θ4 is in the range of 30 degrees to 60 degrees. If the fourth angle Θ4 is less than 30 degrees, it is difficult to shorten the overall length of the lateral support leg 220L, 220R while forming the lateral support leg 220L, 220R in the S-like shape. Also, it is difficult to reduce the deflection of the fishing line guide 200 to a desired extent. Further, if the fourth angle Θ4 is more than 60 degrees, then a portion of the fishing line (for example, the portion 140d of the fishing line shown in FIGS. 14 to 19B) may fail to smoothly move to an apex of the guide ring 210 during the untangling of the tangled fishing line.

When viewing the fishing line guide 200 from the front (see FIGS. 8 and 11A), the outer contour 224 of the lateral support leg 220L, 220R exists between the intersection point P1 of the lower surface of the first attachment portion 222 and the first join point P2 of the outer contour 216 of the guide ring 210. Specifically, within a predetermined section upward from a lower end of the outer contour 224 of the lateral support leg 220L, 220R, the outer contour 224 extends upward from the intersection point P1 of the lower surface of the first attachment portion 222 at a fifth angle Θ5 with respect to the first horizontal line HL1 passing through the intersection point P1 That is, the outer contour 216 of the lateral support leg 220L, 220R is inclined at the fifth angle Θ5 with respect to the first horizontal line HL1 at the intersection point P1 of the lower surface of the first attachment portion 222. In the embodiments, the fifth angle Θ5 is 45 degrees or more and 90 degrees or less. If the fifth angle Θ5 is less than 45 degrees, then a concavity hindering the movement of the fishing line may be formed between the lower end of the lateral support leg 220L, 220R and the first attachment portion 222. Since the fifth angle Θ5 is 45 degrees or more and 90 degrees or less, a portion of the fishing line (for example, a portion 140e of the fishing line shown in FIGS. 14 to 19B) can smoothly move without being caught between the lower end of the lateral support leg 220L, 220R and the first attachment portion 222. Alternatively, the fifth angle Θ5 may be 45 degrees or more and 85 degrees or less. If the fifth angle Θ5 is 90 degrees, then a spacing between the lateral support legs 220L and 220R may become extremely narrow and thus the lateral support legs 220L and 220R may corrode at a gap located therebetween. If the fifth angle Θ5 is 85 degrees or less, the spacing preventing the corrosion of the lateral support legs may be provided between the lateral support legs 220L and 220R.

Further, when viewing the fishing line guide 200 from the front (see FIGS. 8, 11A and 11B), the outer contour 224 of the lateral support legs 220L and 220R includes a second curve line 224a, which has a radius of curvature R2 and a center C2 located outside the outer contour 224, and a third curve line 224b, which has a radius of curvature R3 and a center C3 located inside the outer contour 224. That is, the outer contour 224 of the lateral support legs 220L and 220R extends as the second curve line 224a within a certain section upward from the intersection point P1 of the lower surface of the first attachment portion 222, and then extends to the first join point P2 of the guide ring 210 as the third curve line 224b which curves in an opposite direction to the second curve line 224a.

Figure 12:
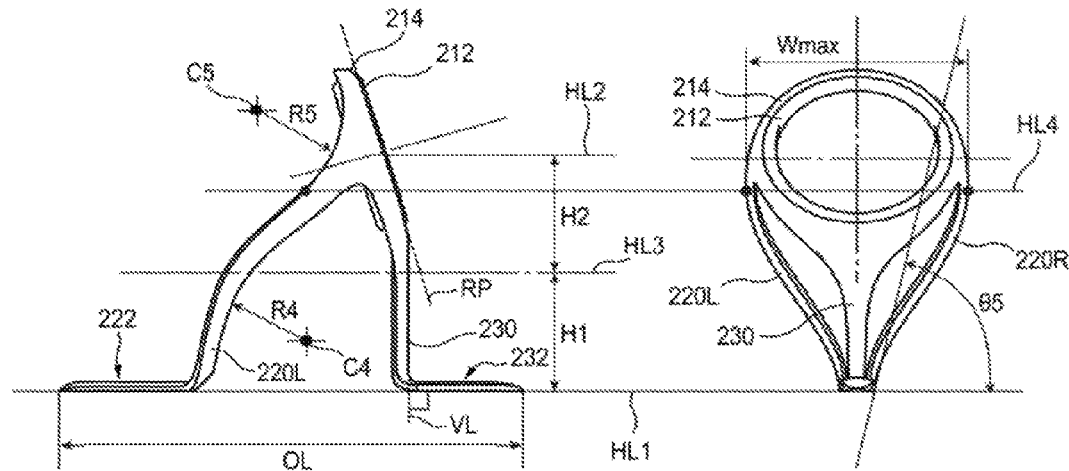
FIG. 12 is a view showing the front view and the side view of the fishing line guide shown in FIG. 7 together.

Referring to FIG. 12, when viewing the fishing line guide 200 from the front, the fishing line guide 200 does not have a maximum width Wmax on a second horizontal line HL2, which passes through the center C0 of the guide ring 210 parallel to the first horizontal line HL1, but has the maximum width Wmax below the second horizontal line HL2. That is, when viewing the fishing line guide 200 from the front and the side, a fourth horizontal line HL4, which passes through the maximum width Wmax of the fishing line guide 200 and is parallel to the first horizontal line HL1, is located within the range of the third curve line 224b (the curve line having the radius of curvature R3 and the center C3 located inside the outer contour 224) among the outer contour 224 of the lateral support leg 220L, 220R. Further, the third curve line 224b of the outer contour 224 of the lateral support leg 220L, 220R joins to the first join point P2 of the outer contour 216 of the guide ring 210 above the fourth horizontal line HL4 passing through the maximum width Wmax of the fishing line guide 200. In some embodiment, the outer contour 224 of the lateral support leg 220L, 220R may include a straight line instead of the second curve line 224a. In such an embodiment, the straight line forming the outer contour 224 of the lateral support leg 220L, 220R extends upward from the intersection point P1 of the first attachment portion 222 at the fifth angle Θ5 with respect to the first horizontal line HL1 within a predetermined section, and connects to the third curve line 224b at its end point. Further, the third curve line 224b of the outer contour 224 of the lateral support leg 220L, 220R may include a plurality of curve lines. In such a case, the curve lines are connected one after another at intersection points while not creating prominences and depressions by which the fishing line is caught.

When viewing the fishing line guide 200 from the side (see FIGS. 9 and 11B), the upper contour 226 of the lateral support legs 220L and 220R includes: a fourth curve line 226a extending from the upper surface 222b of the first attachment portion 222 throughout a predetermined section; a straight line 226b extending from an end point of the fourth curve line 226a throughout a predetermined section; and a fifth curve line 226c located between an end point of the straight line 226b and the first join point P2 and curving in an opposite direction to the fourth curve line 226a. That is, as shown in FIGS. 9 and 11B, the upper contour 226 of the lateral support legs 220L and 220R extends from the first attachment portion 222 as the fourth curve line 226a, and then extends from the fourth curve line 226a as the straight line 226b, and thereafter extends from the straight line 226b as the fifth curve line 226c, and thus joins to the outer contour 216 of the guide ring 210 at the first join point P2.

When viewing the fishing line guide 200 from the side, the fourth curve line 226a has a radius of curvature R4 and a center C4 located more closely to the butt of the fishing rod than the upper contour 226, and the fifth curve line 226c has a radius of curvature R5 and a center C5 located more closely to the tip of the fishing rod than the upper contour 226. Further, the fifth curve line 226c exists in the range of the third curve line 224b of the outer contour 224 of the lateral support leg. That is, when viewing the fishing line guide 200 from the side, the upper contour 226 of the lateral support legs 220L and 220R includes the fourth curve line 226a, which has the radius of curvature R4 and the center C4 located toward the butt of the fishing rod. And, the upper contour 226 of the lateral support legs 220L and 220R includes the fifth curve line 226c, which curves in an opposite direction to the fourth curve line 226a, in the range of the third curve line 224b of the outer contour 224. Further, when viewing the fishing line guide 200 from the side, the fifth curve line 226c is located above the fourth horizontal line HL4 which passes through the maximum width Wmax parallel to the first horizontal line FILL The straight line 226b, which is located between the fourth curve line 226a and the fifth curve line 226c, is the aforementioned straight line TL of the upper contour 226, which is most inclined toward the butt of the fishing rod. The straight line 226b is inclined toward the butt of the fishing rod at the fourth angle Θ4 with respect to the vertical line VL.

In some embodiments, the upper contour 226 of the lateral support legs 220L and 220R may not include the aforementioned straight line 226b. In such an embodiment, the fifth curve line 226c, which is curved in an opposite direction to the fourth curve line 226a, connects to an end point of the fourth curve line 226a, and a tangent line at an intersection between the fourth curve line 226a and the fifth curve line 226c is inclined at the fourth angle Θ4 with respect to the first horizontal line HL1. Further, each of the fourth curve line 226a and the fifth curve line 226c, which form the upper contour 226 of the lateral support legs 220L and 220R, may include a plurality of curve lines. In such a case, the curve lines are connected one after another at intersection points while not creating prominences and depressions by which the fishing line is caught.

The lower contour 228 of the lateral support legs 220L and 220R has a shape similar to the shape of the upper contour 226. The lower contour 228 may include a curve line, which extends from the first attachment portion 222 (for example, similar to the fourth curve line 226a, a curve line having a center located toward the butt of the fishing rod), and a straight line extending from the curve line.

As described above, the lateral support legs 220L, 220R have an S-like shape when viewing the fishing line guide 200 from the front and the side. Specifically, when viewing the fishing line guide 200 from the front, the outer contour 224 of the lateral support legs 220L and 220R extends outward from the first attachment portion 222 as the second curve line 224a having the radius of curvature R2, and then extends inward from the second curve line 224a as the third curve line 224b having the radius of curvature R3. Further, as shown in FIG. 12, with regard to a third horizontal line HL3 bisecting a height ranging from the first horizontal line HL1 to the second horizontal line HL2 passing through the center C0 of the guide ring 210, the second curve line 224a of the outer contour 224 of the lateral support legs 220L and 220R is located at a section H1 located under the third horizontal line HL3, while the fourth horizontal line HL4 passing through the maximum width Wmax of the fishing line guide 200 is located at a section H2 located on the third horizontal line HL3. That is, the fourth horizontal line HL4 passing through the maximum width Wmax of the fishing line guide 200 is located within the range of the third curve line 224b. Further, when viewing the lateral support leg 220L, 220R from the side, the upper contour 226 changes to the fifth curve line 226c, which curves in an opposite direction to the fourth curve line 226a and has the radius of curvature R5, within the range of the third curve line 224b and above the fourth horizontal line HL4 at which the maximum width Wmax is located.

When viewing the fishing line guide 200 from the side (see FIGS. 9 and 11B), the rear contour 236 of the rear support leg 230 is inclined with respect to the rear contour 218 of the guide ring 210. That is, the rear contour 236 of the rear support leg 230 is inclined toward the tip of the fishing rod 100 with respect to the vertical line VL at an angle equal to or less than the first angle Θ1 of the rear contour 218 of the guide ring 210. Further, when viewing the fishing line guide 200 from the side, the rear contour 236 of the rear support leg 230 extends from the rear contour 218 of the guide ring 210 at an angle equal to or less than the first angle Θ1. When referring to the ring plane RP of the guide ring 210, the rear contour 236 of the rear support leg 230 is bent toward the tip of the fishing rod 100 at an angle equal to or less than the first angle Θ1. Further, when viewing the fishing line guide 200 from the side, no concave line exists at an intersection between the rear contour 218 of the guide ring 210 and the rear contour 236 of the rear support leg 230. As shown in FIGS. 9, 11B and 12, where the angle, at which the rear contour 218 of the rear support leg 230 is bent with respect to the guide ring 210, is equal to the aforementioned first angle Θ1, the rear contour 218 of the rear support leg 230 is vertical to the rod body 110 of the fishing rod (vertical to the first horizontal line HL1).

Figure 13A:
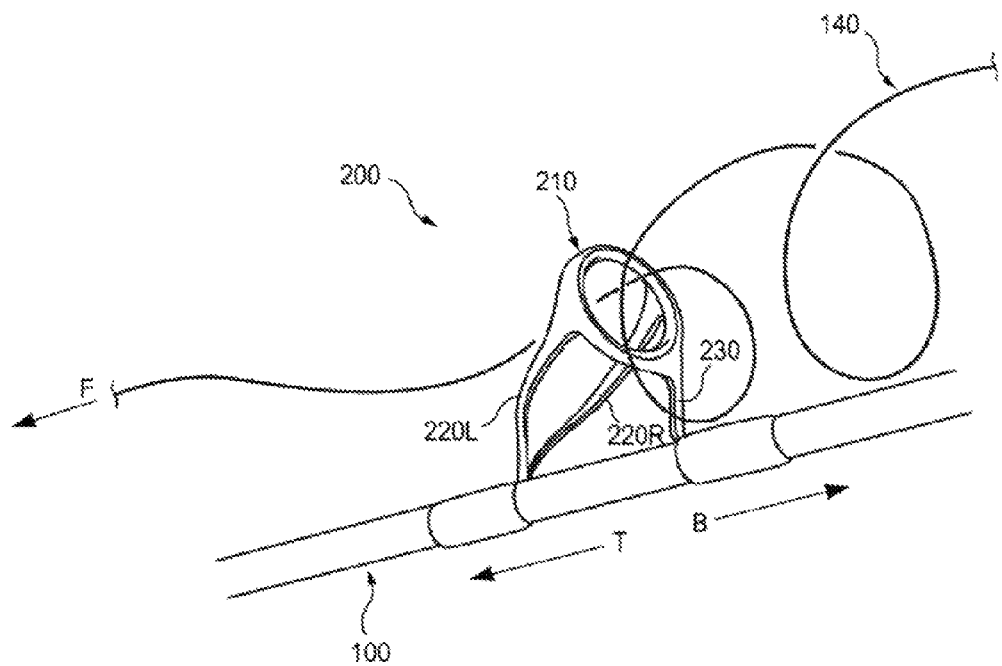
FIG. 13A is a perspective view illustrating that tangling of fishing line occurs in the fishing line guide according to an embodiment.
Figure 13B:
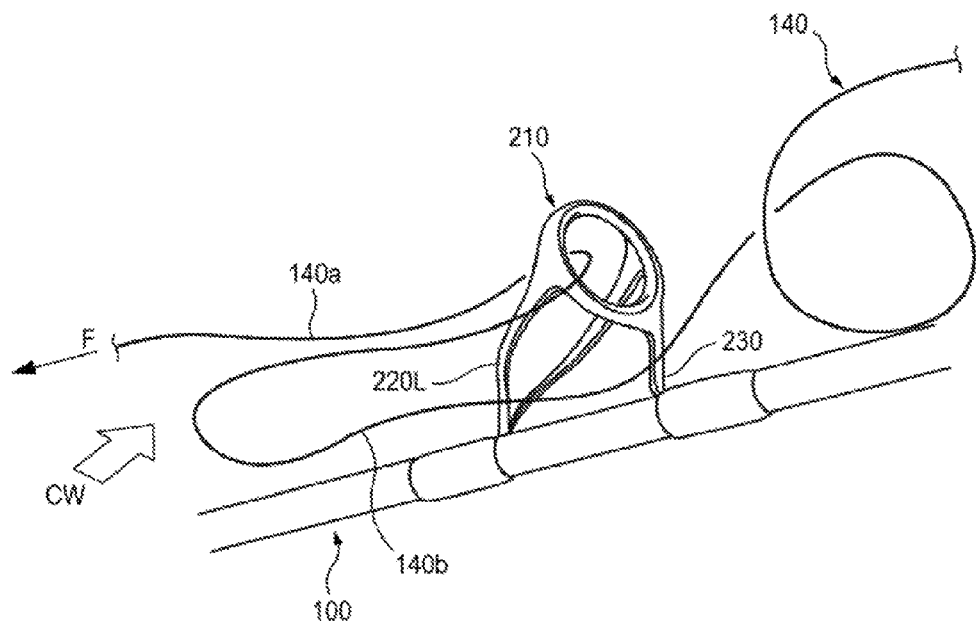
FIG. 13B is a perspective view illustrating that tangling of a fishing line occurs in the fishing line guide according to an embodiment.
Figure 13C:
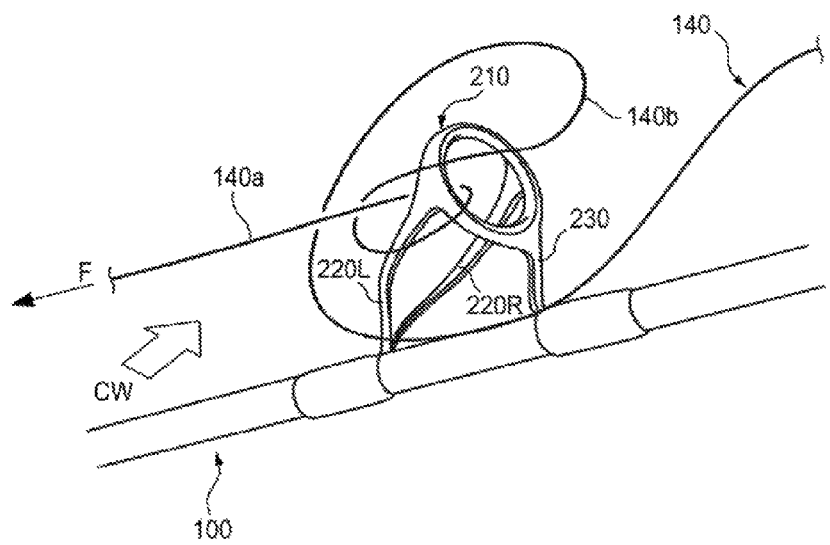
FIG. 13C is a perspective view illustrating that tangling of a fishing line occurs in the fishing line guide according to an embodiment.

FIGS. 13A to 13D show an example where the fishing line is tangled in the fishing line guide 200 according to an embodiment during casting a fishing rig. In FIGS. 13A to 13D, an arrow F indicates a tension applied to the fishing line during casting. In FIGS. 13B and 13C, an arrow CW indicates a crosswind applied to the fishing rod 100 during casting.

Figure 13D:
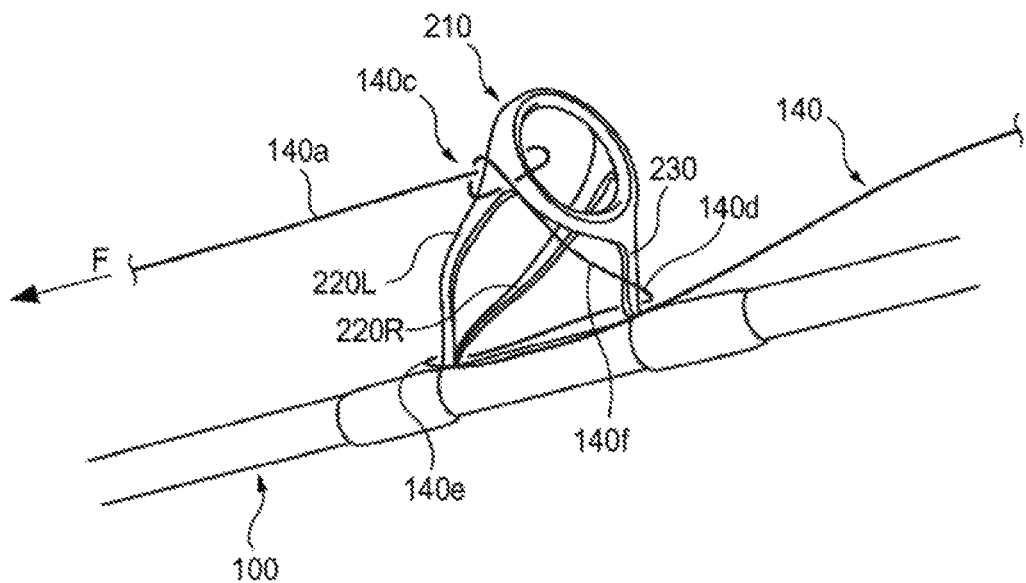
FIG. 13D is a perspective view illustrating that tangling of a fishing line occurs in the fishing line guide according to an embodiment.

Referring to FIG. 13A, the fishing line 140 is spirally reeled out from the reel 130 of the fishing rod 100 during casting a fishing rig. The fishing line 140, which is spirally reeled out, is straightened while passing through the guide ring 210. As shown in FIG. 13B, if the speed of the fishing line passing through the guide ring 210 is reduced, then a portion 140b of the fishing line, which does not yet pass through the guide ring 210, may be positioned between a portion 140a of the fishing line, which already passed through the guide ring 210, and the fishing line guide 200. At this time, as shown in FIGS. 13C and 13D, the portion 140b of the fishing line, which does not yet pass through the guide ring 210, may turn around the portion 140a of the fishing line, which already passed through the guide ring 210, due to the crosswind CW and then be wound with the fishing line guide 200. Therefore, tangling of a fishing line may occur. If the tangling of a fishing line occurs, then a folded portion 140c at which the fishing line 140 is folded back is formed at an upper portion of the guide ring 210 of the fishing line guide 200. A portion 140d of the fishing line is caught by a lower end of the rear support leg 230, a portion 140e of the fishing line is caught by a lower end of the lateral support leg 220L, 220R, and a portion 140f of the fishing line is located below a lower periphery of the guide ring 210.

Descriptions are made as to an example of untangling the tangled fishing line with reference to FIGS. 14 to 19B. Although the tangling of the fishing line occurs as shown in FIG. 13D, a tension F still acts through the fishing line 140 due to the force from casting. Under the state where such a tension acts, the tangled fishing line 140 is untangled by the above-described shape features of the fishing line guide 200.

Figure 14:
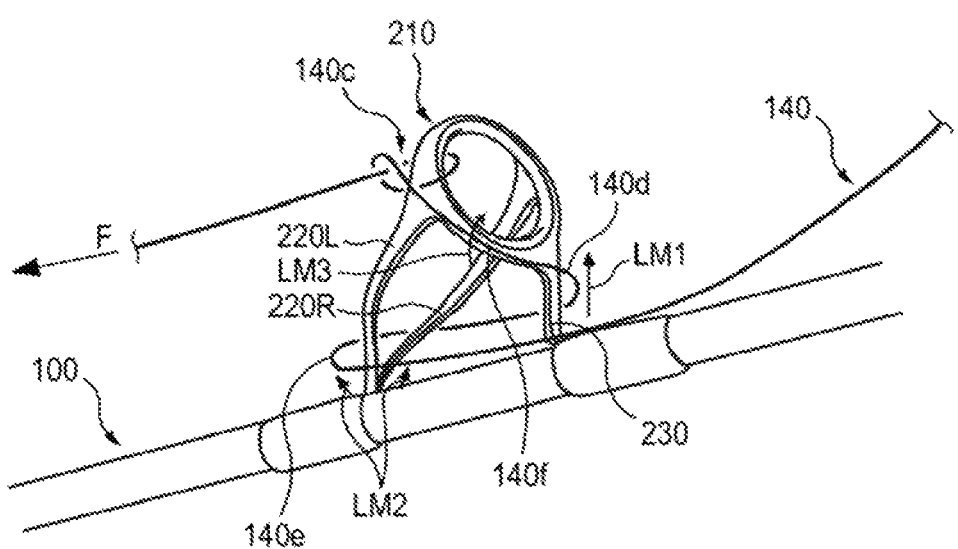
FIG. 14 is a perspective view illustrating that tangling of a fishing line is untangled in the fishing line guide according to an embodiment.

FIG. 14 illustrates that the tangled fishing line is untangled while the fishing line 140 is moved by the tension F under the state where the tangling of the fishing line occurs during casting as shown in FIG. 13D. In FIG. 14, arrows LM1, LM2 and LM3 indicate the movements of the portions 140d, 140e and 140f of the fishing line respectively. The fishing line 140 is pulled in a direction of the tension F and the folded portion 140c generally stays in its position.

Figure 15A:
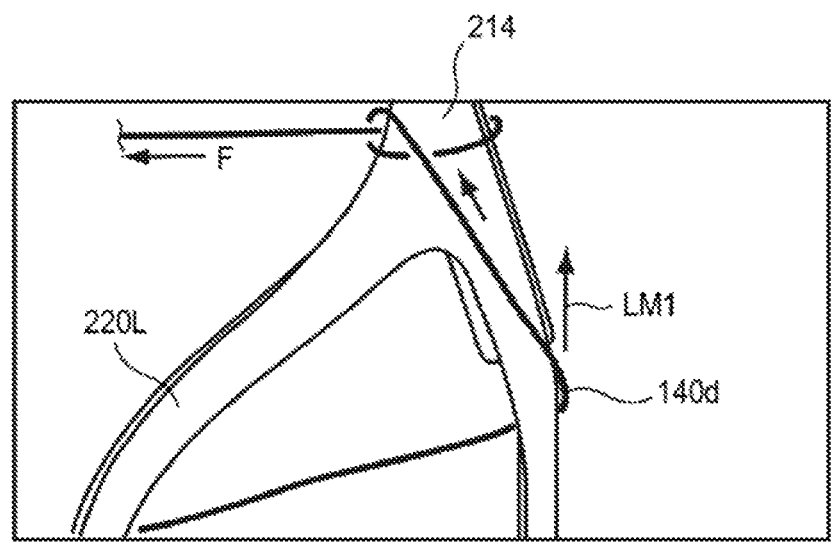
FIG. 15A is a view showing the movement of the fishing line shown in FIG. 14.

The portion 140d of the fishing line, which is caught by the rear support leg 230, is moved in a direction of the arrow LM1 along the rear contour 236 of the rear support leg 230 across the intersection between the rear contour 218 of the guide ring 210 and the rear contour 236 of the rear support leg 230. The rear contour 236 of the rear support leg 230 is vertical to the fishing rod 100, or is bent from the rear contour 218 of the guide ring 210 toward the tip of the fishing rod 100 at an angle equal to or less than the first angle Θ1. That is, the rear contour 236 of the rear support leg 230 is not inclined toward the butt of the fishing rod 100. Further, no concavity hindering the movement of the portion 140d of the fishing line exists between the rear contour 236 of the rear support leg 230 and the rear contour 218 of the guide ring 210. Thus, as shown in FIG. 15A, the portion 140d of the fishing line is moved toward the guide ring 210 due to the tension F from casting.

Figure 15B:
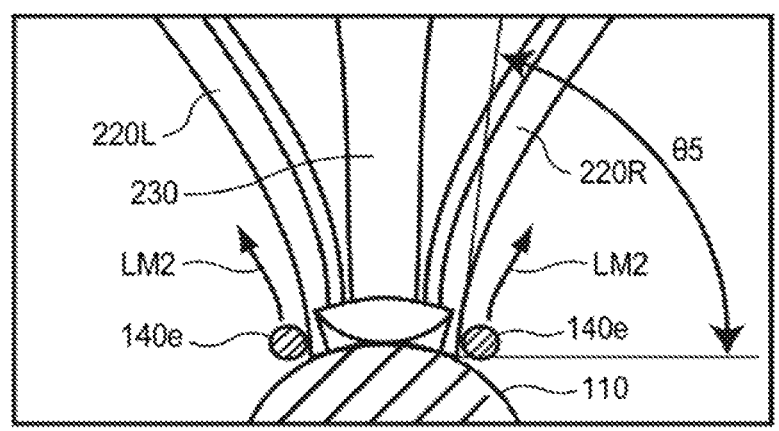
FIG. 15B is a view showing the movement of the fishing line shown in FIG. 14.

Further, along with the upward movement of the portion 140d of the fishing line, the portion 140e of the fishing line, which is caught by the lower end of the lateral support leg 220L, 220R, is moved upward in a direction of the arrow LM2 along the lateral support leg 220L, 220R. The outer contour 224 of the lateral support leg 220L, 220R proceeds upward from the intersection point P1 of the first attachment portion 222 at the fifth angle Θ5 (e.g., 45 degrees). Thus, no concavity hindering the movement of the fishing line exists at the lower end of the lateral support leg 220L, 220R. That is, as shown in FIG. 15B, the portion 140e of the fishing line is not caught by the lower end of the lateral support leg 220L, 220R and is moved upward along the second curve line 224a of the outer contour of the lateral support leg 220L, 220R.

Figure 15C:
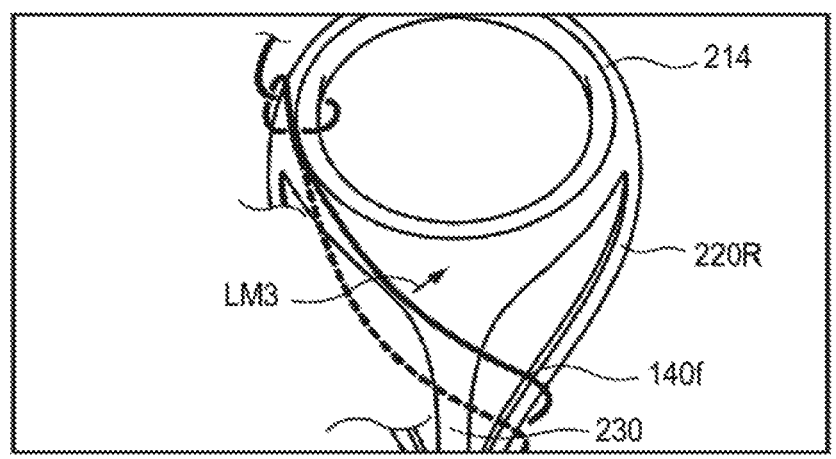
FIG. 15C is a view showing the movement of the fishing line shown in FIG. 14.
Figure 15D:
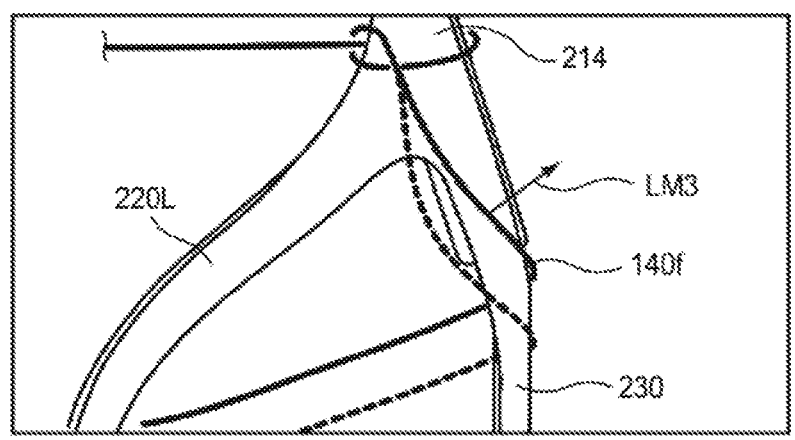
FIG. 15D is a view showing the movement of the fishing line shown in FIG. 14.

Further, along with the movement of the portion 140d of the fishing line, the portion 140f of the fishing line, which is located immediately below the guide ring 210, goes over the lower periphery of the guide ring 210 and is moved upward in a direction of the arrow LM3. The outer contour 216 of the guide ring 210 does not have the circular arc CA, which has the center C6 located inside the outer contour 216, from the inflection point P5. The outer contour 216 of the guide ring 210 has the straight line, which touches the inflection point P5, or the first curve line 216b, which has the center C1 located outside the outer contour 216, from the inflection point P5. Thus, as shown in FIGS. 15C and 15D, the portion 140f of the fishing line is moved upward without being caught by the lower periphery of the guide ring 210.

Figure 16:
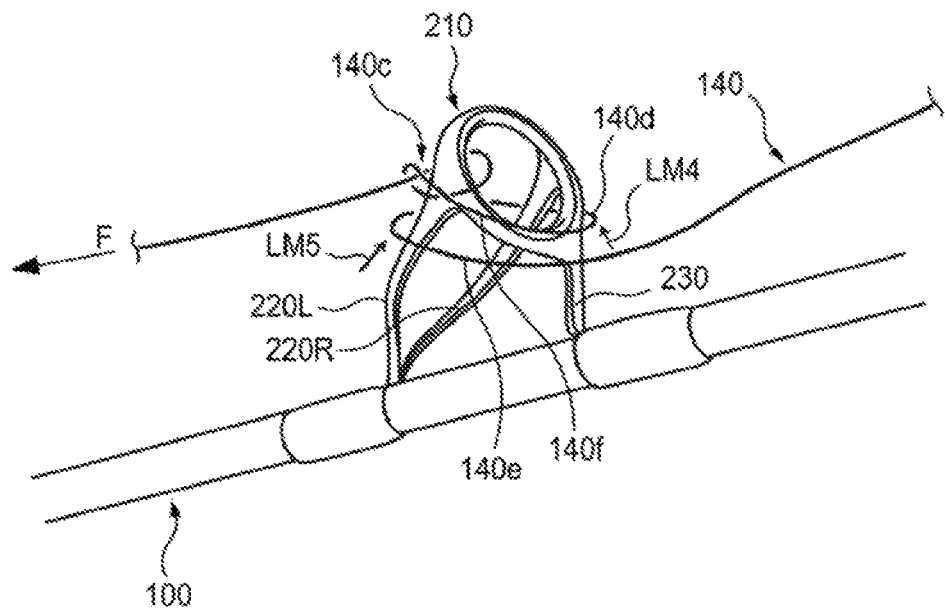
FIG. 16 is a perspective view illustrating that the tangled fishing line is untangled in the fishing line guide according to an embodiment, showing the movement subsequent to the movement of the fishing line shown in FIG. 14.
Figure 17A:
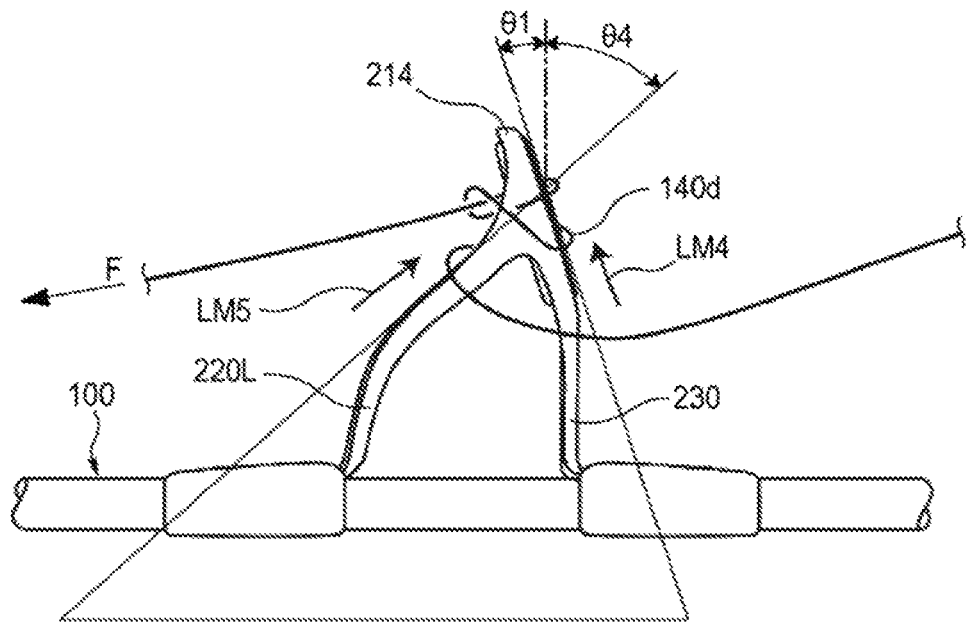
FIG. 17A is a side view and a diagram showing the movement of the fishing line shown in FIG. 16.
Figure 17B:
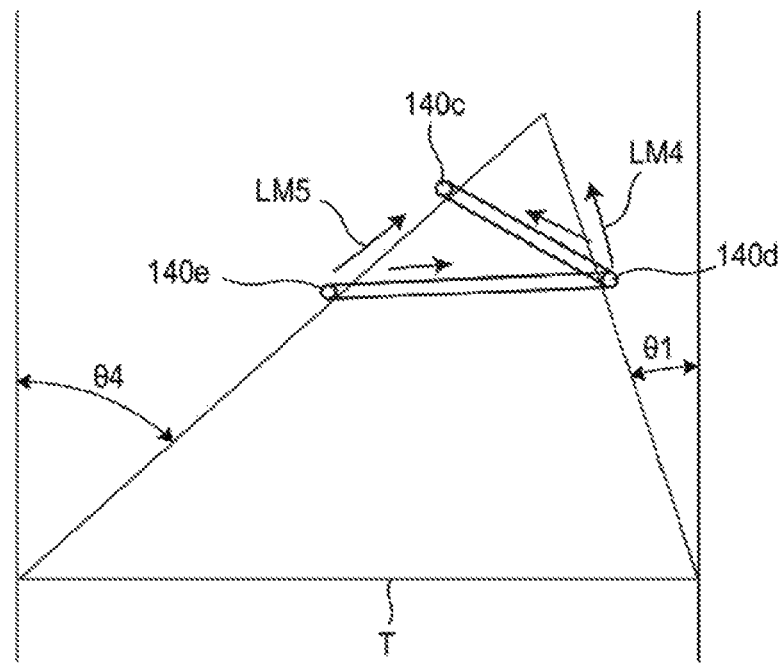
FIG. 17B is a side view and a diagram showing the movement of the fishing line shown in FIG. 16.

FIG. 16 illustrates the movement of the fishing line subsequent to the movement of the fishing line shown in FIG. 14. Since the tension F from casting acts, the portion 140d of the fishing line, which is moved to the guide ring 210, and the portion 140f of the fishing line, which goes over the lower periphery of the guide ring 210, are moved upward in a direction of an arrow LM4 along the rear contour 218 of the guide ring 210. Further, the portion 140e of the fishing line, which is moved along the outer contour 224 of the lateral support leg 220L, 220R, is moved upward in a direction of an arrow LM5 along the upper contour 224 of the lateral support leg 220L, 220R. That is, as shown in FIG. 17A, since the guide ring 210 is inclined toward the tip of the fishing rod at the first angle Θ1, the portions 140d and 140f of the fishing line are moved upward along the rear contour 218 of the guide ring 210 in accordance with the first angle Θ1 at which the guide ring 210 is inclined. Since the first angle Θ1 is in the range of 5 degrees to 20 degrees, the portions 140d and 140f of the fishing line are smoothly moved upward. When viewing the fishing line guide 200 from the side, the movement of the portions 140d and 140f of the fishing line in the direction of the arrow LM4 and the movement of the portion 140e of the fishing line in the direction of the arrow LM5 are made along the oblique sides of a triangle T due to the first angle Θ1 of the guide ring 210 and the fourth angle Θ4 of the lateral support leg 220L, 220R (see FIG. 17B). Regarding the movement in the arrow LM5, if the tension F acts to the fishing line under the state where the folded portion 140c acts as a fulcrum, the portions 140d and 140e of the fishing line are so shaped as to wind the triangle T, and the portions 140d and 140e of the fishing line smoothly proceed to the apex of the triangle T since the fourth angle Θ4 of the lateral support leg 220L, 220R is in the range of 30 degrees to 60 degrees. As the portions 140d and 140e of the fishing line approach the folded portion 140c, the tension F may be weakened at the folded portion 140c. However, because of the shape of the triangle T seen in the side view of the fishing line guide 200, the portions 140d, 140e and 140f of the fishing line can be moved toward the apex of the triangle T.

Figure 18:
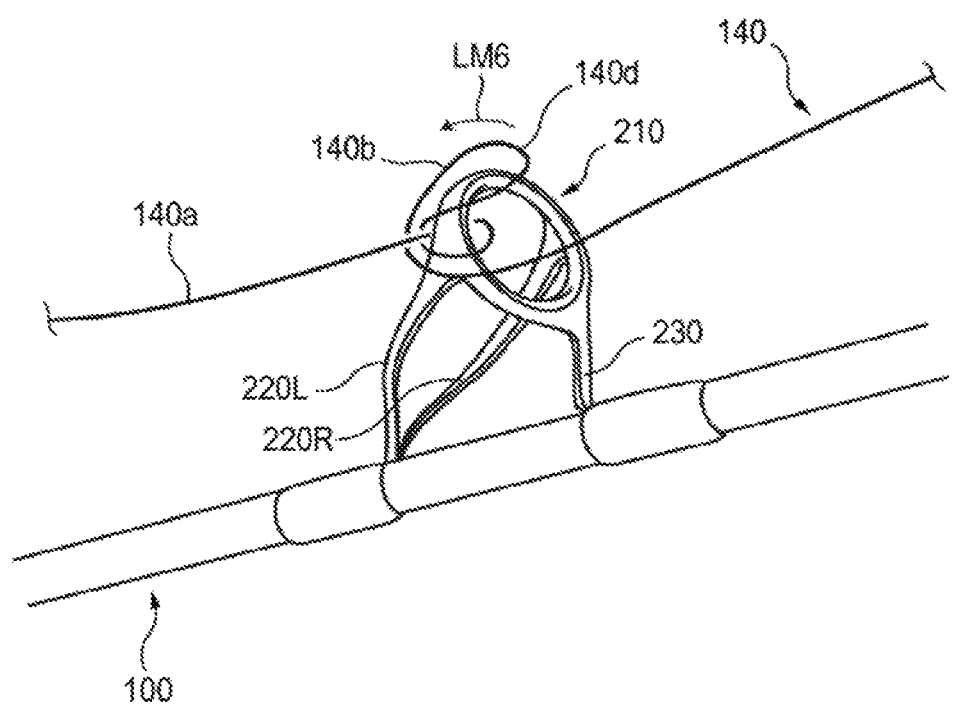
FIG. 18 is a perspective view illustrating that the tangled fishing line is untangled in the fishing line guide according to an embodiment, showing the movement subsequent to the movement of the fishing line shown in FIG. 16.
Figure 19A:
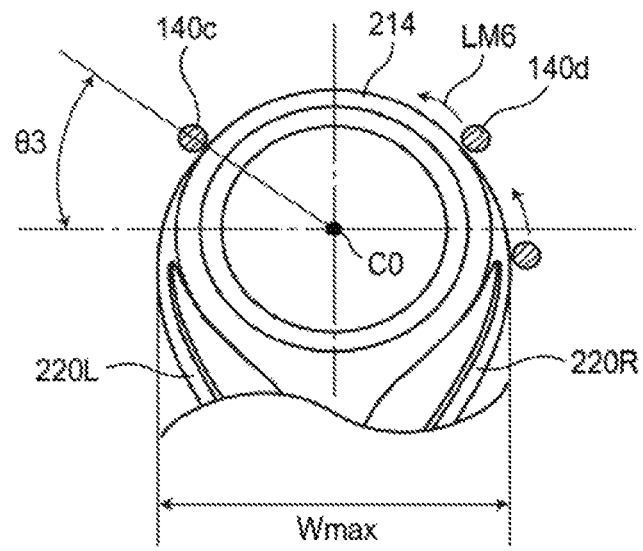
FIG. 19A is a view showing the movement of fishing line in FIG. 18.
Figure 19B:
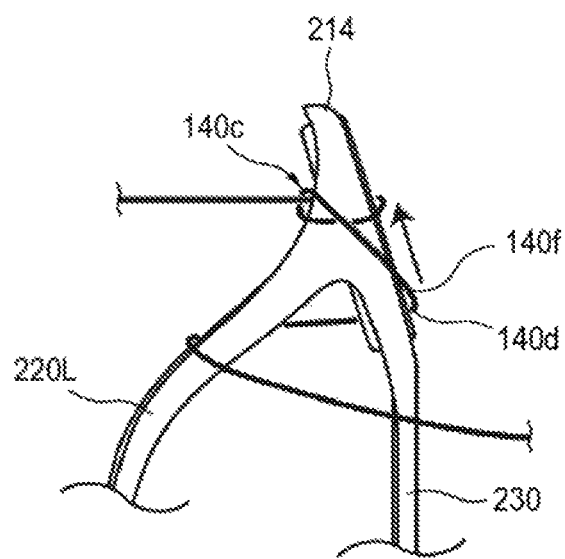
FIG. 19B is a view showing the movement of fishing line in FIG. 18.

FIG. 18 illustrates the movement of the fishing line subsequent to the movement of the fishing line shown in FIG. 16. Referring to FIGS. 18, 19A and 19B, the tangled fishing line 140 is untangled without the movement of the folded portion 140c. That is, as the portion 140d of the fishing line goes over the upper apex of the guide ring 210, the tangled fishing line is untangled.

If the portion 140d of the fishing line, which is moved upward along the outer contour 216 of the guide ring 210 and the upper contour 226 of the lateral support leg 220L, 220R (e.g., the fourth curve line 226a and the straight line 226b), goes over the maximum width Wmax of the fishing line guide 200, then the portion 140d of the fishing line is moved upward along the third curve line 224b of the outer contour 224 of the lateral support leg 220L, 220R and the fifth curve line 226c of the upper contour 226 of the lateral support leg 220L, 220R. The first join point P2 between the upper contour 226 of the lateral support leg 220L, 220R and the outer contour 216 of the guide ring 210 is located at the third angle Θ3 above the center C0 of the guide ring 210. Thus, the portion 140d of the fishing line passes the third curve line 224b of the outer contour 224 and then moves toward the folded portion 140c along the circular arc 216a of the outer contour 216 of the guide ring 210, thereby untangling the tangled fishing line. The first join point P2 between the upper contour 226 of the lateral support leg 220L, 220R and the outer contour 216 of the guide ring 210 is located upward at an angle equal to or more than the third angle Θ3 (e.g., 25 degrees) with respect to the center C0 of the guide ring 210. Thus, it does not occur that the portion 140d of the fishing line is caught again by the guide ring 210 due to friction resistance.

Figure 20B:
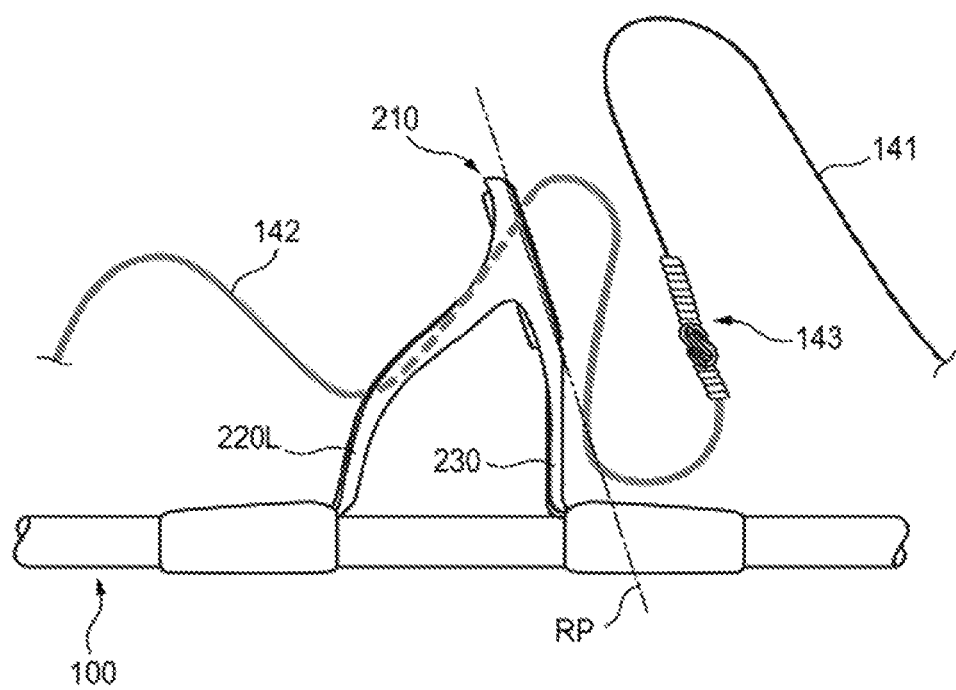
FIG. 20B is a view illustrating that a tie portion of the fishing line is not caught by the fishing line guide according to an embodiment.
Figure 20C:
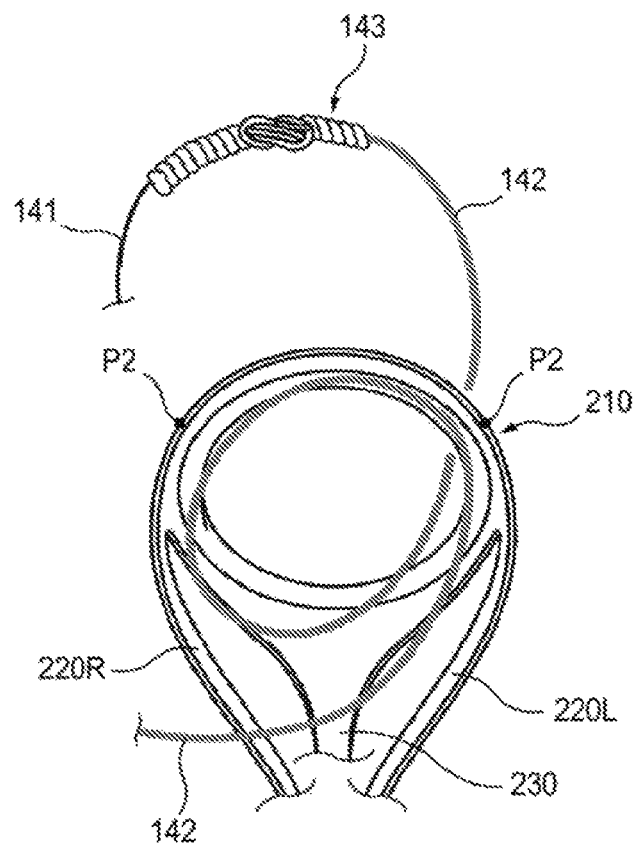
FIG. 20C is a view illustrating that a tie portion of the fishing line is not caught by the fishing line guide according to an embodiment.

FIGS. 20A to 20C show an example where a tie portion of the fishing line is not fitted to the fishing line guide 200 according to an embodiment.

The fishing line 140 has a PE line 141, a leader 142 and a tie portion 143 tying the PE line and the leader together. As described above, the rear contour 236 of the rear support leg 230 is inclined toward the tip of the fishing rod 100 with respect to the ring plane RP of the guide ring 210 and its inclination angle is up to an angle perpendicular to the fishing rod 100. That is, the rear contour 236 of the rear support leg 230 does not lie on an extension line of the ring plane RP of the guide ring 210. Therefore, the leader 142 and the tie portion 143 does not come into contact with the rear support leg 230 during the casting of a fishing rig. Further, the fishing line guide 200 includes a single rear support leg 230. Therefore, although the tie portion 143 irregularly moves during casting a fishing rig, the contact of the leader 142 and the tie portion 143 to the rear support leg 230 is suppressed to a minimum. Moreover, the fishing line guide 200 does not have a narrow gap to which the tie portion 143 may be fitted between the rear support leg 230 and the guide ring 210. Further, the third curve line 224b of the outer contour 224 of the lateral support leg 220L, 220R, which has the center C3 and the radius of curvature R3, joins to the guide ring 210 at the first join point P2 above the maximum width Wmax. Thus, although the leader 142 and the tie portion 143 are not completely straightened after passing through the guide ring 210 but is somewhat spiral, the contact of the leader 142 and the tie portion 143 to the lateral support leg 220L, 220R is suppressed to a minimum.

Referring again to FIGS. 11A and 12, descriptions are made as to the feature of reducing deflection which the fishing line guide 200 according to an embodiment has.

In an example of fishing using the leader 142, large impact is applied to the fishing line guide. Thus, to suppress vibration resulting from the impact, it is required to reduce the deflection of the fishing line guide. Further, to reduce the deflection of the fishing line guide, it is effective to shorten the overall length of the fishing line guide.

In the fishing line guide 200 according to an embodiment, the upper contour 226 of the lateral support legs 220L and 220R has the fourth curve line 226a at its lower portion and the fifth curve line 226c at its upper portion. The fourth curve line 226a has the radius of curvature R4 and the center C4 located toward the butt of the fishing rod. The fifth curve line 226c has the radius of curvature R5 and the center C5 located toward the tip of the fishing rod. That is, the upper contour 226 of the lateral support legs 220L and 220R includes the fourth curve line 226a having the center C4 and the fifth curve line 226c which has the center C5 and curves in an opposite direction to the fourth curve line 226a. Since the upper contour 226 is formed in an S-like shape as such, the fishing line guide 200 can have a shorter overall length OL while untangling the tangled fishing line and maintaining the strength of the lateral support legs 220L and 220R. Regarding the movement of the fishing line for untangling the tangled fishing line illustrated in FIGS. 15B and 17A, the concavity hindering the movement of the fishing line does not exist at the lower end of the lateral support leg 220L, 220R, and therefore the portion 140e of the fishing line is moved upward along the second curve line 224a of the outer contour of the lateral support leg 220L, 220R. Accordingly, the lower portion of the lateral support leg 220L, 220R does not need to be inclined with respect to the vertical line VL at such an inclination as the fourth angle Θ4. The overall length OL of the fishing line guide 200 can be shortened by curving the lower portion of the lateral support leg 220L, 220R to the extent of the radius of curvature R4 of the fourth curve line 226a. Regarding the movement of the fishing line for untangling the tangled fishing line illustrated in FIGS. 18, 19A and 19B, if the portion 140d of the fishing line passes the maximum width Wmax of the fishing line guide 200, then the portion 140d of the fishing line is moved upward along the outer periphery of the guide ring 210 because of the decrease in the width of the fishing line guide 200. Accordingly, when the portion 140d of the fishing line passes the maximum width Wmax of the fishing line guide 200 and is further moved, the lateral support leg 220L, 220R may not need to be inclined very much. The fifth curve line 226c, which is located at the upper portion of the upper contour 226 of the lateral support leg 220L, 220R and has the center C5 located toward the tip of the fishing rod, may be curved in an opposite direction to the fourth curve line 226a located below the fifth curve line 226c. Thus, the overall length OL of the fishing line guide 200 can be shortened. As such, with regard to the third horizontal line HL3 bisecting the height ranging from the first horizontal line HL1 touching the lower surfaces of the first and second attachment portions 222 and 232 to the second horizontal line HL2 passing through the center C0 of the guide ring 210 in the fishing line guide 200 according to an embodiment, in view of a balance between the strength of the lateral support legs 220L and 220R and the untangling of the tangled fishing line, the maximum width Wmax of the fishing line guide 200 is located at the section H2 on the third horizontal line HL3, and at least a portion of the fifth curve line 226c of the upper contour 226 is located at the section H2 on the third horizontal line HL3. The fourth curve line 226a and the fifth curve line 226c, which form the upper contour 226 of the lateral support leg 220L, 220R, may be formed by using two or more curve lines or line segments.

Further, when viewing the fishing line guide 200 from the front, the outer contour 224 of the lateral support legs 220L and 220R is inclined from the first attachment portion 222 at an angle equal to or more than 45 degrees (the fifth angle Θ5) with respect to the first horizontal line HL1 touching the lower surface of the first attachment portion 222. Accordingly, when compared with the fishing line guide of the prior art, the fishing line guide 200 according to an embodiment has the lateral support legs 220L, 220R extending from the first attachment portion 222 at a large angle. Since the lateral support legs 220L and 220R extend from the first attachment portion 222 at a large angle, the lateral support legs 220L and 220R have a large deflection angle. Thus, the press working on the lateral support legs 220L, 220R gives work hardening to the lateral support legs 220L and 220R, and the fishing line guide 200 may thereby have higher rigidity. Further, the lateral support legs 220L and 220R have a large resistance against bending, and thus the deflection of the fishing line guide 200 can be decreased considerably.

Figure 21A:
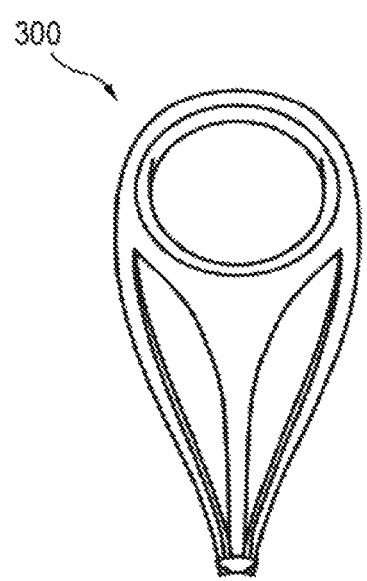
FIG. 21A is a front view of a fishing line guide according to another embodiment.
Figure 21B:
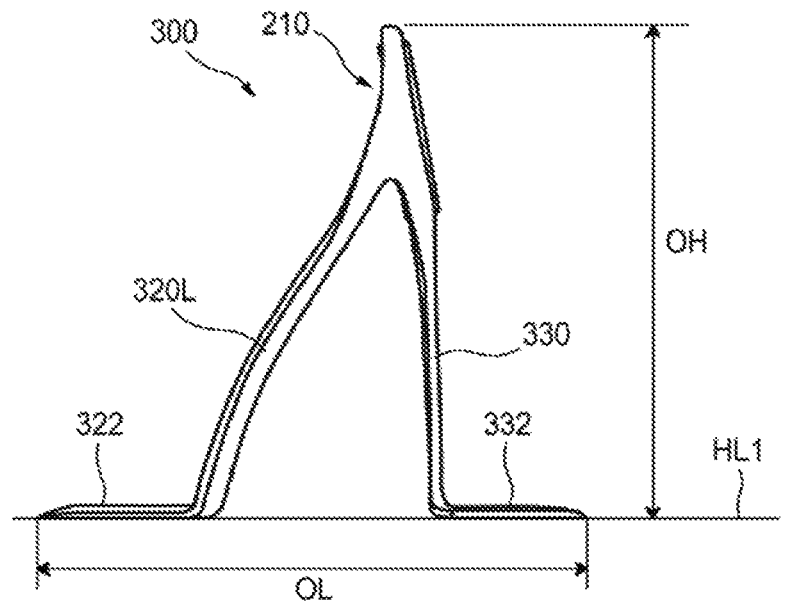
FIG. 21B is a side view of the fishing line guide according to another embodiment.

FIGS. 21A and 21B show a fishing line guide according to another embodiment. When compared with the fishing line guide 200 of the foregoing embodiment, the fishing line guide 300 shown in FIGS. 21A and 21B has an overall height OH greater than an overall length OL. Said overall length OL is defined as a length between an end of a second attachment portion 332 of a rear support leg 330 toward the butt of the fishing rod and an end of a first attachment portion 322 of a lateral support leg 320L toward the tip of the fishing rod. Said overall height OH is defined as a height between the first horizontal line HL1 touching the lower surfaces of first and second attachment portions 322 and 332 and the upper end of the guide ring 210.

Figure 22:
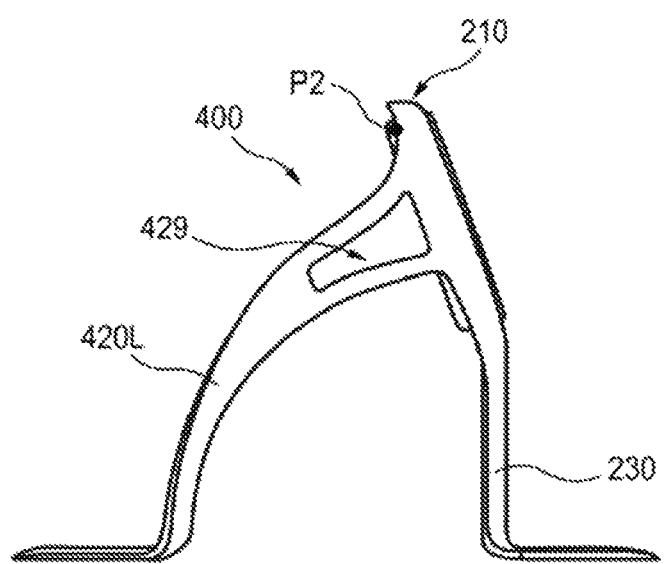
FIG. 22 is a side view of a fishing line guide according to a further embodiment.

FIG. 22 shows a fishing line guide according to a further embodiment. In the fishing line guide 400 shown in FIG. 22, the first join point P2 between an upper contour of a lateral support leg 420L and the outer contour of the guide ring 210 is located higher than that of the fishing line guide 200 of the foregoing embodiment, thus providing smoother untangling of the tangled fishing line. Further, a width of the lateral support leg 420L is wider than that of the fishing line guide 200 of the foregoing embodiment. Further, the lateral support leg 420L has an opening 429 adjacent to the guide ring 210, thus resulting in a fishing line guide 400 which is lightweight and has a wider lateral support leg.

Figure 23:
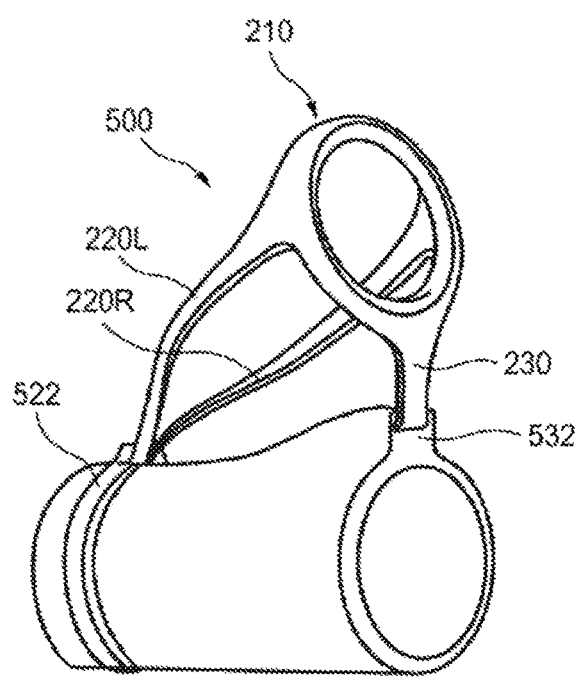
FIG. 23 is a perspective view of a fishing line guide according to a still another embodiment.

FIG. 23 shows a fishing line guide according a still another embodiment. In the fishing line guide 500 shown in FIG. 23, a first attachment portion 522 of the lateral support legs 220L and 220R and a second attachment portion 532 of the rear support leg 230 are shaped in the shape of a ring. Such a fishing line guide 500 may be used for a telescopic type fishing rod.

The present disclosure described heretofore should not be limited to the above-described embodiments and the accompanying drawings. It will be apparent to those of ordinary skill in the technical field to which the present disclosure pertains, that various substitutions, modifications and alternations may be made without departing from the technical idea of the present disclosure.

DESCRIPTION OF REFERENCE SYMBOLS 100 fishing rod, 110 rod body of fishing rod, 130 reel, 140 fishing line, 200, 300, 400, 500 fishing line guide, 210 guide ring, 216 outer contour of guide ring, 218 rear contour of guide ring, 220L, 220R lateral support leg, 222 first attachment portion, 224 outer contour of lateral support leg, 226 upper contour of lateral support leg, 228 lower contour of lateral support leg, 230 rear support leg, 232 second attachment portion, 234 outer contour of rear support leg, 236 rear contour of rear support leg

What is claimed is:

1. A fishing line guide, comprising:
   a guide ring guiding a fishing line;
   a pair of lateral support legs extending from diametrically opposing lateral sides of the guide ring toward a tip of a fishing rod respectively and approaching each other at a lower end, the pair of lateral support legs including, at the lower end thereof, a first attachment portion for attachment to a rod body of the fishing rod; and
   one rear support leg extending from an underside of the guide ring and including, at a lower end thereof, a second attachment portion for attachment to the rod body of the fishing rod,
   wherein, when viewing the fishing line guide from front, the guide ring has an outer contour, the lateral support legs have an outer contour joining to the outer contour of the guide ring at a first join point, and the rear support leg has an outer contour joining to the outer contour of the guide ring,
   wherein, when viewing the fishing line guide from side, the guide ring has a rear contour facing toward a butt of the fishing rod, the lateral support legs have an upper contour joining to the outer contour of the guide ring at the first join point and a lower contour joining to the outer contour of the guide ring at a second join point, and the rear support leg has a rear contour joining to the rear contour of the guide ring and facing toward the butt of the fishing rod,
   wherein the rear contour of the guide ring is inclined at a first angle toward the tip of the fishing rod with respect to a vertical line which is vertical to a first horizontal line touching lower surfaces of the first and second attachment portions,
   wherein the rear contour of the rear support leg is inclined with respect to the rear contour of the guide ring at an angle equal to or less than the first angle with respect to the vertical line,
   wherein, when viewing the fishing line guide from the front, the outer contour of the lateral support legs is inclined at an angle of 45 degrees or more and 90 degrees or less with respect to the first horizontal line at an intersection point to the lower surface of the first attachment portion,
   wherein, when viewing the guide ring in an orthogonal direction, the outer contour of the guide ring comprises a circular arc having two end points located below at a second angle with respect to a center of the guide ring, a center of the circular arc being the center of the guide ring, and a straight line or a first curve line between the end point of the circular arc and the outer contour of the rear support leg, the first curve line having a center located outside the outer contour of the guide ring, and
   wherein, when viewing the guide ring in the orthogonal direction, the first join point is located above the center of the guide ring at a third angle with respect to the center of the guide ring, and the second join point is located below the center of the guide ring.

2. The fishing line guide of claim 1, wherein the first angle is in a range of 5 degrees to 20 degrees.

3. The fishing line guide of claim 1, wherein the rear contour of the rear support leg extends from the rear contour of the guide ring at an angle equal to or less than the first angle.

4. The fishing line guide of claim 3, wherein the rear contour of the rear support leg is perpendicular to the first horizontal line.

5. The fishing line guide of claim 1, wherein the second angle is 30 degrees to 45 degrees.

6. The fishing line guide of claim 1, wherein the third angle is 25 degrees to 40 degrees.

7. The fishing line guide of claim 1, wherein the outer contour of the lateral support legs comprises a second curve line extending upward from the intersection point of the lower surface of the first attachment portion and a third curve line extending from the second curve line to the first join point,
   wherein, when viewing the fishing line guide from the front, the second curve line has a center located outside the outer contour of the lateral support legs and the third curve line has a center located inside the outer contour of the lateral support legs, and
   wherein, when viewing the fishing line guide from the front, the fishing line guide has a maximum width in a range of the third curve line.

8. The fishing line guide of claim 7, wherein the fishing line guide has the maximum width above a third horizontal line which bisects a height between the first horizontal line and a second horizontal line passing through the center of the guide ring parallel to the first horizontal line, and
   wherein the second curve line is located below the third horizontal line.

9. The fishing line guide of claim 7, wherein the upper contour of the lateral support legs comprises a fourth curve line extending upward from the first attachment portion and a fifth curve line extending from the fourth curve line to the first join point and existing in the range of the third curve line of the outer contour of the lateral support legs, and
   wherein, when viewing the fishing line guide from the side, the fourth curve line has a center located further toward the butt of the fishing rod than the upper contour, the fifth curve line has a center located further toward the tip of the fishing rod than the upper contour, and a tangent line at an intersection between the fourth curve line and the fifth curve line is inclined at a fourth angle toward the butt of the fishing rod with respect to the vertical line.

10. The fishing line guide of claim 9, wherein the upper contour of the lateral support legs further comprises a straight line which is inclined at the fourth angle between the fourth curve line and the fifth curve line.

11. The fishing line guide of claim 9, wherein the fourth angle is in a range of 30 degrees to 60 degrees.

12. The fishing line guide of claim 9, wherein the fifth curve line is located above a fourth horizontal line passing through the maximum width parallel to the first horizontal line.

13. The fishing line guide of claim 1, wherein the outer contour and the upper contour of the lateral support legs have an S-like shape.

14. The fishing line guide of claim 1, wherein a length between an end of the first attachment portion toward the tip of the fishing rod and an end of the second attachment portion toward the butt of the fishing rod is less than a height between the first horizontal line and an upper end of the guide ring.

15. The fishing line guide of claim 1, wherein the lateral support legs have an opening adjacent to the guide ring.

16. The fishing line guide of claim 1, wherein the first attachment portion and the second attachment portion has a shape of a ring.

17. A fishing rod including the fishing line guide of claim 1.

\* \* \* \* \*